United States Patent
Ozawa et al.

(10) Patent No.: US 10,654,017 B2
(45) Date of Patent: May 19, 2020

(54) SUPPLY-LIQUID PRODUCING APPARATUS AND SUPPLY-LIQUID PRODUCING METHOD

(71) Applicant: EBARA CORPORATION

(72) Inventors: Suguru Ozawa, Tokyo (JP); Yoichi Nakagawa, Tokyo (JP); Muneto Takahashi, Tokyo (JP); Tao Xu, Tokyo (JP); Toshio Yokoyama, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 83 days.

(21) Appl. No.: 16/069,862

(22) PCT Filed: Jan. 13, 2017

(86) PCT No.: PCT/JP2017/000983
§ 371 (c)(1),
(2) Date: Jul. 12, 2018

(87) PCT Pub. No.: WO2017/122771
PCT Pub. Date: Jul. 20, 2017

(65) Prior Publication Data
US 2019/0015801 A1     Jan. 17, 2019

(30) Foreign Application Priority Data

Jan. 15, 2016  (JP) ............................... 2016-005814
Jan. 10, 2017  (JP) ............................... 2017-001731

(51) Int. Cl.
*B01F 3/04*     (2006.01)
*B01F 15/02*    (2006.01)
(Continued)

(52) U.S. Cl.
CPC ........ *B01F 15/0243* (2013.01); *B01F 3/0446* (2013.01); *B01F 3/04503* (2013.01);
(Continued)

(58) Field of Classification Search
None
See application file for complete search history.

(56) References Cited

U.S. PATENT DOCUMENTS

| 2008/0002518 A1* | 1/2008 | Fittkau ............... B01F 3/04496 |
| | | 366/152.1 |
| 2009/0145463 A1 | 6/2009 | Oh et al. |

(Continued)

FOREIGN PATENT DOCUMENTS

| EP | 0723806 A2 | 7/1996 |
| JP | H09-000906 A | 1/1997 |

(Continued)

OTHER PUBLICATIONS

International Patent Application No. PCT/JP2017/000983; Int'l Search Report; dated Apr. 18, 2017; 4 pages.

(Continued)

*Primary Examiner* — John Fox
(74) *Attorney, Agent, or Firm* — BakerHostetler

(57) ABSTRACT

Provided is a supply-liquid producing apparatus capable of producing a supply liquid by an amount needed at a use point.
A supply-liquid producing apparatus includes a mixer that mixes water and ozone gas to produce ozone water; a booster pump that increases the pressure of the water supplied to the mixer; a gas-liquid separation tank that separates the ozone water produced by the mixer into ozone water to be supplied to a use point and exhaust gas to be discharged from an exhaust port; a flowmeter that measures the flow rate of the ozone water supplied from the gas-liquid separation tank to the use point; a flow control unit that adjusts the (flow rate of the water supplied to the mixer by controlling the booster pump in response to the flow rate of the ozone water measured by the flowmeter; and an exhaust (Continued)

pressure control unit that controls the exhaust pressure to keep constant the water level in the gas-liquid separation tank.

12 Claims, 6 Drawing Sheets

(51) Int. Cl.
*B01F 3/22* (2006.01)
*B01F 5/04* (2006.01)
*G05D 11/13* (2006.01)
*B01F 3/08* (2006.01)
*B01F 1/00* (2006.01)

(52) U.S. Cl.
CPC .......... *B01F 3/04985* (2013.01); *B01F 3/088* (2013.01); *B01F 3/2223* (2013.01); *B01F 5/0413* (2013.01); *G05D 11/132* (2013.01); *G05D 11/135* (2013.01); *B01F 1/0022* (2013.01); *B01F 1/0038* (2013.01); *B01F 2003/04886* (2013.01); *B01F 2215/0096* (2013.01)

(56) References Cited

U.S. PATENT DOCUMENTS

| | | | |
|---|---|---|---|
| 2010/0147690 | A1 | 6/2010 | Audunson et al. |
| 2013/0341288 | A1* | 12/2013 | Takahashi ........... B01F 3/04503 210/748.19 |
| 2017/0087522 | A1 | 3/2017 | Maeda et al. |
| 2019/0105417 | A1* | 4/2019 | Ditzler .................... A61L 2/183 |

FOREIGN PATENT DOCUMENTS

| | | |
|---|---|---|
| JP | 2003-236353 A | 8/2003 |
| JP | 2003-260341 A | 9/2003 |
| JP | 2010-214263 A | 9/2010 |
| JP | 2012-024719 A | 2/2012 |
| JP | 2014-117628 A | 6/2014 |
| JP | 2015-181976 A | 10/2015 |
| WO | WO 2017/122771 A1 | 7/2017 |

OTHER PUBLICATIONS

Singapore Patent Application No. 11201805417P; Search Report and Written Opinion; dated Aug. 19, 2019; 8 pages.
European Patent Application No. 17738523.4; Extended Search Report; dated Oct. 31, 2019; 9 pages.

\* cited by examiner

SUPPLY-LIQUID PRODUCING APPARATUS AND SUPPLY-LIQUID PRODUCING METHOD

CROSS-REFERENCE TO RELATED APPLICATIONS

The present disclosure is a 371 U.S. National Stage Application of Patent Application No. PCT/JP2017/000983 filed in Japan on Jan. 13, 2017, which claims priority to Japanese Patent Application Nos. 2016-005814, filed on Jan. 15, 2016, and 2017-001731, filed on Jan. 10, 2017. The entire contents of which are hereby incorporated by reference.

TECHNICAL FIELD

The present invention relates to a supply-liquid producing apparatus that mixes a first raw material and a second raw material to produce a supply liquid.

BACKGROUND ART

Recently, cleaning of products in a semiconductor device plant, and a factory for producing liquid crystal electronic components and the like has been becoming increasingly sophisticated with complication of production processes, and fine circuit patterns. For example, fine particles, metal, organic matter and the like adhered to a silicon wafer are removed by use of a special liquid (referred to as a cleaning solution) prepared by dissolving high-purity gas or high-purity gas and chemicals in a functional water (such as ultrapure water).

As a cleaning processing system, a "sheet processing system" for performing chemical cleaning and ultrapure water cleaning for each wafer in accordance with products of small-volume production in great varieties is employed in addition to a "batch processing system" for repeating soaking operation and cleaning operation of a plurality of silicon wafers at the same time. Cleaning process time (tact time) per wafer in the sheet processing system is longer than cleaning process time per wafer in the batch processing system, and the used amount of a cleaning solution per wafer is large, and therefore shortening of the tact time and reduction of the used amount of the cleaning solution are requested. In the present situation, in order to perform effective cleaning for a short time, and reduce the used amount of the cleaning solution, an advanced cleaning process for singly or simultaneously using a plurality of functional waters and chemicals, and switching a cleaning process for a short time is performed.

As the functional water, for example, ozone water prepared by dissolving ozone gas in ultrapure water is used. Ozone dissolved in ultrapure water has extremely strong oxidizability even at low concentration (several ppm), and therefore can remove organic matter or metal. This ozone water is generally produced by an ozone-water producing apparatus. With increase in sophistication and complication of the cleaning process, ozone water supply and stop to a cleaning apparatus for a short time are required. However, when a conventional apparatus stops production of ozone water once, a certain amount of time (rise time) is required until ozone water can be supplied at required ozone concentration and at a required flow rate again. Therefore, in order to respond to supply request of ozone water to the cleaning apparatus, the ozone-water producing apparatus regularly produces ozone water, and continuously supplies the produced ozone water to the cleaning apparatus. As a result, an excess amount of ozone water is supplied to the cleaning apparatus, and unused ozone water which is not used for cleaning of a silicon wafer is discharged as waste water from the cleaning apparatus.

Conventionally, there is proposed a circulation type ozone-water supplying apparatus capable of supplying ozone water having constant concentration and constant pressure, and recycling unused ozone water regardless of the used amount of the ozone water at a use point (refer to Patent Literature 1).

In the conventional circulation type ozone-water supplying apparatus, as illustrated in FIG. 6, water and ozone gas are supplied to an ozone dissolving tank 12 to produce ozone water, supplies the ozone water from the ozone dissolving tank 12 to a circulation tank 21, supplies the ozone water from the circulation tank 21 to a use point through an ozone-water supply pipe 22, returns the ozone water which is not consumed at the use point to the circulation tank 21 through an ozone-water return pipe 23, and supplies the ozone water from the circulation tank 21 to the use point again. Then, the in-tank pressure of the ozone dissolving tank 12, the in-tank pressure of the circulation tank 21, and the in-pipe pressure of the ozone-water return pipe 23 are maintained constant, and the in-tank pressure of the circulation tank 21 is controlled to pressure lower than each of the in-tank pressure of the ozone dissolving tank 12 and the in-pipe pressure of the ozone-water return pipe 23.

CITATION LIST

Patent Literature

Patent Literature 1: Japanese Patent Laid-Open No. 2014-117628

SUMMARY OF INVENTION

Technical Problem

However, the conventional ozone-water supplying apparatus employs a circulation type for circulating ozone water (unused ozone water) to be recycled, and therefore it is necessary to take measures against temperature rise or contamination of ozone water due to the circulation of the ozone water (unused ozone water). Therefore, development of a technology for producing ozone water by an amount needed at a use point is desired.

The present invention has been made in view of the above problem, and an object of the present invention is to provide a supply-liquid producing apparatus that does not need to take measures against temperature rise or contamination of a supply liquid (such as ozone water) due to circulation, or reduces at least necessity of the measures, and is capable of producing the supply liquid by an amount needed at a use point. More specifically, an object of the present invention is to provide a supply-liquid producing apparatus capable of supplying a supply liquid having a constant flow rate or constant pressure and constant concentration to a use point.

Solution to Problem

A supply-liquid producing apparatus of the present invention includes: a mixing unit that mixes a first raw material and a second raw material to produce a mixed liquid; a pump unit that changes a flow rate of the first raw material to be supplied to the mixing unit; a gas-liquid separation tank unit that separates the mixed liquid produced by the mixing unit into a supply liquid to be supplied to a use point, and exhaust gas to be discharged from an exhaust port; a valve that adjusts an opening so as to determine an exhaust amount of the exhaust gas; a flow measuring unit that measures a flow rate of the supply liquid to be supplied from the gas-liquid separation tank unit to the use point; and a flow control unit that adjusts the flow rate of the first raw material to be supplied to the mixing unit by receiving a flow rate value of the supply liquid measured by the flow measuring unit, producing a control signal for controlling the pump unit in response to the received flow rate value, and transmitting the control signal to the pump unit to control a pump.

According to this configuration, the flow rate of the liquid (supply water) to be supplied to the use point is measured after the gas-liquid separation, and therefore the flow rate of the supply liquid can be accurately measured without substantially receiving any influence by air bubbles of gas (exhaust gas) generated by mixing the first raw material and the second raw material. The flow rate value of the supply liquid measured by the flow measuring unit is received, and the control signal for controlling the pump unit is produced in response to the received flow rate value, and the control signal is transmitted to the pump unit to control the pump, so that the flow rate of the first raw material is adjusted in response to the flow rate of the supply liquid thus measured, and therefore the supply liquid (such as ozone water) can be produced by an amount needed at the use point.

The supply-liquid producing apparatus of the present invention may further include a second flow measuring unit that measures the flow rate of the first raw material to be supplied to the mixing unit, in which the flow control unit may perform feedback control for making the flow rate of the first raw material measured by the second flow measuring unit coincide with the flow rate of the supply liquid measured by the flow measuring unit.

According to this configuration, the flow rate of the first raw material is monitored, and when the flow rate is deviated from a desired flow rate, the feedback control of the pump can be performed in order to amend the flow rate.

The supply-liquid producing apparatus of the present invention may further include a flow controller that determines a flow rate of the second raw material, in which the flow controller may adjust a production amount of the second raw material in response to the flow rate of the first raw material measured by the second flow measuring unit.

According to this configuration, relation between the flow rate of the first raw material and the flow rate of the second material previously can be obtained so as to obtain a supply liquid having target concentration, and the second raw material can be allowed to flow in response to the flow rate of the first raw material.

A supply-liquid producing apparatus of the present invention includes: a mixing unit that mixes a first raw material and a second raw material to produce a mixed liquid; a booster pump unit that increases pressure of the first raw material to be supplied to the mixing unit; a gas-liquid separation tank unit that separates the mixed liquid produced by the mixing unit into a supply liquid to be supplied to a use point, and exhaust gas to be discharged from an exhaust port; a flow measuring unit that measures a flow rate of the supply liquid to be supplied from the gas-liquid separation tank unit to the use point; and a boosting control unit that adjusts pressure of the first raw material to be increased in pressure and supplied to the mixing unit by controlling the booster pump unit in response to the flow rate of the supply liquid measured by the flow measuring unit; and an exhaust pressure control unit that controls exhaust pressure of the exhaust gas such that a liquid amount in the gas-liquid separation tank unit is kept constant.

According to this configuration, the flow rate of the liquid (supply liquid) to be supplied to the use point is measured after the gas-liquid separation, and therefore the flow rate of the supply liquid can be accurately measured without substantially receiving any influence by air bubbles of gas (exhaust gas) generated by mixing the first raw material and the second raw material. The pressure of the first raw material (to be increased in pressure and supplied to the mixing unit) is adjusted in response to the flow rate of the supply liquid thus measured, the exhaust pressure of the exhaust gas is controlled, and the liquid amount in the gas-liquid separation tank unit is kept constant. Consequently, the supply liquid (such as ozone water) can be produced by an amount needed at the use point.

The supply-liquid producing apparatus of the present invention may further include a liquid amount adjustment unit for adjusting the liquid amount in the gas-liquid separation tank unit to be constant.

According to this configuration, the liquid amount in the gas-liquid separation tank unit can be kept constant, and the supply liquid (such as ozone water) can be produced by an amount needed at the use point.

In the supply-liquid producing apparatus of the present invention, the liquid amount adjustment unit may further include a liquid amount measuring unit that measures the liquid amount in the gas-liquid separation tank unit.

According to this configuration, the liquid amount measuring unit can measure the liquid amount in the gas-liquid separation tank unit to keep the liquid amount in the gas-liquid separation tank unit constant, and produce the supply liquid (such as ozone water) by an amount needed at the use point.

In the supply-liquid producing apparatus of the present invention, the liquid amount adjustment unit may further include the flow measuring unit, and a second flow measuring unit that measures the flow rate of the liquid to be supplied to the mixing unit.

According to this configuration, the flow rate of the liquid to be supplied to the mixing unit is measured, the flow rate of the liquid to be discharged from the gas-liquid separation tank unit (to be supplied to the use point) is measured, the flow rate of the liquid to be supplied to the mixing unit, and the flow rate of the liquid to be discharged from the gas-liquid separation tank are made to be the same, so that the amount of the liquid in the gas-liquid separation tank unit can be kept constant, and the supply liquid (such as ozone water) can be produced by an amount needed at the use point.

In the supply-liquid producing apparatus of the present invention, the first raw material may be water, and the second raw material may be ozone gas or a chemical raw material.

According to this configuration, the mixing unit can mix water and ozone gas to produce ozone water. Alternatively, the mixing unit can mix water and a chemical raw material (such as ammonia) to produce chemical water (such as ammonia water). In this case, the booster pump unit is disposed at a front stage of the mixing unit (upstream side with respect to the mixing unit), and therefore the booster pump unit allows only water to pass. Therefore, the life of the booster pump unit is prolonged compared to a case where the booster pump unit is provided at a rear stage of the mixing unit.

A supply-liquid producing method of the present invention includes the steps of: increasing pressure of a first raw material by a booster pump unit to supply the first raw material to a mixing unit; mixing the first raw material and a second raw material to produce a mixed liquid by the mixing unit; separating the mixed liquid produced by the mixing unit into a supply liquid to be supplied to a use point, and exhaust gas to be discharged from an exhaust port by a gas-liquid separation tank unit; measuring a flow rate of the supply liquid to be supplied from the gas-liquid separation tank unit to the use point; adjusting pressure of the first raw material to be increased in pressure and supplied to the mixing unit by controlling the booster pump unit in response to the measured flow rate of the supply liquid; and controlling exhaust pressure of the exhaust gas such that a liquid amount in the gas-liquid separation tank unit is kept constant.

By this producing method, the flow rate of the liquid (supply water) to be supplied to the use point is measured after the gas-liquid separation, and therefore the flow rate of the supply liquid can be accurately measured without receiving any influence by air bubbles of gas (exhaust gas) generated by mixing the first raw material and the second raw material. The pressure (or the flow rate) of the first raw material (to be increased in pressure and supplied to the mixing unit) is adjusted in response to the flow rate of the supply liquid thus measured, the exhaust pressure of the exhaust gas is controlled, and the liquid amount (pressure) in the gas-liquid separation tank unit is kept constant. Consequently, the supply liquid (such as ozone water) can be produced by an amount needed at the use point.

A supply-liquid producing apparatus of the present invention includes: a mixing unit that mixes a first raw material and a second raw material to produce a mixed liquid; a pump unit that changes a flow rate of the first raw material to be supplied to the mixing unit; a gas-liquid separation tank unit that separates the mixed liquid produced by the mixing unit into a supply liquid to be supplied to a use point, and exhaust gas to be discharged from an exhaust port; a first flow measuring unit that measures the flow rate of the supply liquid to be supplied from the gas-liquid separation tank unit to the use point; an exhaust valve that adjusts an exhaust amount of the exhaust gas to be discharged from the exhaust port; and an exhaust control unit that adjusts the exhaust amount of the exhaust gas to be discharged from the exhaust port by controlling the exhaust valve in response to the flow rate of the supply liquid measured by the first flow measuring unit such that the flow rate of the supply liquid to be supplied to the use point is kept at a constant flow rate, in which the exhaust control unit increases the exhaust amount of the exhaust gas to be discharged from the exhaust port in a case where the flow rate of the supply liquid measured by the first flow measuring unit increases with respect to the constant flow rate, and the exhaust control unit decreases the exhaust amount of the exhaust gas to be discharged from the exhaust port in a case where the flow rate of the supply liquid measured by the first flow measuring unit decreases with respect to the constant flow rate.

According to this configuration, in a case where the flow rate of the supply liquid to be supplied to the use point increases with respect to the constant flow rate as the target, that is, in a case where the flow rate of the supply liquid measured by the first flow measuring unit increases with respect to the constant flow rate as the target, the exhaust amount of the exhaust gas to be discharged from the exhaust port is increased, and the pressure in the gas-liquid separation tank unit is lowered, so that the flow rate of the supply liquid to be supplied to the use point is decreased. On the other hand, in a case where the flow rate of the supply liquid to be supplied to the use point decreases with respect to the constant flow rate as the target, that is, in a case where the flow rate of the supply liquid measured by the first flow measuring unit decreases with respect to the constant flow rate as the target, the exhaust amount of the exhaust gas to be discharged from the exhaust port is decreased, and the pressure in the gas-liquid separation tank unit is raised, so that the flow rate of the supply liquid to be supplied to the use point is increased. Thus, it is also possible to keep the flow rate of the supply liquid to be supplied to the use point constant.

The supply-liquid producing apparatus of the present invention may further include a flow control unit that adjusts the flow rate of the first raw material to be supplied to the mixing unit by controlling the pump unit in response to the flow rate of the supply liquid measured by the first flow measuring unit, in which the flow control unit may control such that flow rate of the supply liquid measured by the first flow measuring unit may become the same as the flow rate of the first raw material to be supplied to the mixing unit.

According to this configuration, the flow rate of the first raw material to be supplied to the mixing unit is adjusted such that the flow rate of the supply liquid measured by the first flow measuring unit, and the flow rate of the first raw material to be supplied to the mixing unit become the same, and therefore it is possible to keep the liquid amount in the gas-liquid separation tank unit constant.

The supply-liquid producing apparatus of the present invention may further include a second flow measuring unit that measures the flow rate of the first raw material to be supplied to the mixing unit.

According to this configuration, the flow rate of the first raw material to be supplied to the mixing unit can be adjusted such that the flow rate measured by the second flow measuring unit becomes the same as the flow rate measured by the first flow measuring unit.

The supply-liquid producing apparatus of the present invention may further have a liquid amount measuring unit that detects a liquid amount in the gas-liquid separation tank unit, in which the boosting control unit may decrease the flow rate of the first raw material to be supplied to the mixing unit in a case where the liquid amount in the gas-liquid separation tank unit measured by the liquid amount measuring unit increases with respect to a predetermined liquid amount, and the boosting control unit may increase the flow rate of the first raw material to be supplied to the mixing unit in a case where the liquid amount in the gas-liquid separation tank unit measured by the liquid amount measuring unit decreases with respect to the predetermined liquid amount.

According to this configuration, even when the flow rate of the first raw material to be supplied to the mixing unit is not measured, the liquid amount in the gas-liquid separation tank unit is detected, so that the flow rate of the first raw material to be supplied to the mixing unit can be adjusted so as to keep the liquid amount in the gas-liquid separation tank unit constant.

A supply-liquid producing method of the present invention includes the steps of: mixing a first raw material and a second raw material to produce a mixed liquid by a mixing unit; separating the mixed liquid produced by the mixing unit into a supply liquid to be supplied to a use point, and exhaust gas to be discharged from an exhaust port by a gas-liquid separation tank unit; measuring a flow rate of the supply liquid to be supplied from the gas-liquid separation tank unit to the use point by a first flow measuring unit; and adjusting an exhaust amount of the exhaust gas to be discharged from the exhaust port by an exhaust valve in response to the flow rate of the supply liquid measured by the first flow measuring unit such that the flow rate of the supply liquid to be supplied to the use point is kept at a constant flow rate, in which in the step of adjusting the exhaust amount of the exhaust gas, the exhaust amount of the exhaust gas to be discharged from the exhaust port is increased in a case where the flow rate of the supply liquid measured by the first flow measuring unit increases with respect to the constant flow rate, and the exhaust amount of the exhaust gas to be discharged from the exhaust port is decreased in a case where the flow rate of the supply liquid measured by the flow measuring unit decreases with respect to the constant flow rate.

By this producing method, in a case where the flow rate of the supply liquid to be supplied to the use point increases with respect to the constant flow rate as the target, that is, in a case where the flow rate of the supply liquid measured by the first flow measuring unit increases with respect to the constant flow rate as the target, the exhaust amount of the exhaust gas to be discharged from the exhaust port is increased, and the pressure in the gas-liquid separation tank unit is lowered, so that the flow rate of the supply liquid to be supplied to the use point is decreased. On the other hand, in a case where the flow rate of the supply liquid to be supplied to the use point decreases with respect to the constant flow rate as the target, that is, in a case where the flow rate of the supply liquid measured by the first flow measuring unit decreases with respect to the constant flow rate as the target, the exhaust amount of the exhaust gas to be discharged from the exhaust port is decreased, and the pressure in the gas-liquid separation tank unit is raised, so that the flow rate of the supply liquid to be supplied to the use point is increased. Thus, it is possible to keep the flow rate of the supply liquid to be supplied to the use point constant.

A supply-liquid producing apparatus of the present invention includes: a mixing unit that mixes a first raw material and a second raw material to produce a mixed liquid; a pump unit that changes a flow rate of the first raw material to be supplied to the mixing unit; a gas-liquid separation tank unit that separates the mixed liquid produced by the mixing unit into a supply liquid to be supplied to a use point, and exhaust gas to be discharged from an exhaust port; a pressure measuring unit that measures pressure of the supply liquid to be supplied from the gas-liquid separation tank unit to the use point; an exhaust valve that adjusts an exhaust amount of the exhaust gas to be discharged from the exhaust port; and an exhaust control unit that adjusts the exhaust amount of the exhaust gas to be discharged from the exhaust port by controlling the exhaust valve in response to the pressure of the supply liquid measured by the pressure measuring unit such that the pressure of the supply liquid to be supplied to the use point is kept at constant pressure, in which the exhaust control unit increases the exhaust amount of the exhaust gas to be discharged from the exhaust port in a case where the pressure of the supply liquid measured by the pressure measuring unit increases with respect to the constant pressure, and the exhaust control unit decreases the exhaust amount of the exhaust gas to be discharged from the exhaust port in a case where the pressure of the supply liquid measured by the pressure measuring unit decreases with respect to the constant pressure.

According to this configuration, in a case where the pressure of the supply liquid to be supplied to the use point increases, that is, in a case where the pressure of the supply liquid measured by the pressure measuring unit increases, the exhaust amount of the exhaust gas to be discharged from the exhaust port is increased, and the pressure in the gas-liquid separation tank unit is lowered, so that the pressure of the supply liquid to be supplied to the use point is decreased. On the other hand, in a case where the pressure of the supply liquid to be supplied to the use point decreases, that is, in a case where the pressure of the supply liquid measured by the pressure measuring unit decreases, the exhaust amount of the exhaust gas to be discharged from the exhaust port is decreased, and the pressure in the gas-liquid separation tank unit is raised, so that the pressure of the supply liquid to be supplied to the use point is increased. Thus, it is possible to keep the pressure of the supply liquid to be supplied to the use point constant.

The supply-liquid producing apparatus of the present invention may further include a first flow measuring unit that measures the flow rate of the supply liquid to be supplied from the gas-liquid separation tank unit to the use point; and a flow control unit that adjusts the flow rate of the first raw material to be supplied to the mixing unit by controlling the pump unit in response to the flow rate of the supply liquid measured by the first flow measuring unit, in which the flow control unit may control such that the flow rate of the supply liquid measured by the first flow measuring unit becomes the same as the flow rate of the first raw material to be supplied to the mixing unit.

According to this configuration, the flow rate of the first raw material to be supplied to the mixing unit is adjusted such that the flow rate of the supply liquid measured by the first flow measuring unit, and the flow rate of the first raw material to be supplied to the mixing unit become the same, and therefore it is possible to keep the liquid amount in the gas-liquid separation tank unit constant.

The supply-liquid producing apparatus of the present invention may further include a second flow measuring unit that measures the flow rate of the first raw material to be supplied to the mixing unit.

According to this configuration, the flow rate of the first raw material to be supplied to the mixing unit can be adjusted such that the flow rate measured by the second flow measuring unit becomes the same as the flow rate measured by the first flow measuring unit.

The supply-liquid producing apparatus of the present invention may further have a liquid amount measuring unit that detects a liquid amount in the gas-liquid separation tank unit, in which the flow control unit may decrease the flow rate of the first raw material to be supplied to the mixing unit in a case where the liquid amount in the gas-liquid separation tank unit measured by the liquid amount measuring unit increases with respect to a predetermined liquid amount, and the flow control unit may increase the flow rate of the first raw material to be supplied to the mixing unit in a case where the liquid amount in the gas-liquid separation tank unit measured by the liquid amount measuring unit decreases with respect to the predetermined liquid amount.

According to this configuration, even when the flow rate of the first raw material to be supplied to the mixing unit is not measured, the liquid amount in the gas-liquid separation tank unit is detected, so that the flow rate of the first raw material to be supplied to the mixing unit can be adjusted so as to keep the liquid amount in the gas-liquid separation tank unit constant.

A supply-liquid producing method of the present invention including the steps of: mixing a first raw material and a second raw material to produce a mixed liquid by a mixing unit; separating the mixed liquid produced by the mixing unit into a supply liquid to be supplied to a use point, and exhaust gas to be discharged from an exhaust port by a gas-liquid separation tank unit; measuring pressure of the supply liquid to be supplied from the gas-liquid separation tank unit to the use point by a pressure measuring unit; and adjusting an exhaust amount of the exhaust gas to be discharged from the exhaust port by an exhaust valve in response to the pressure of the supply liquid measured by the pressure measuring unit such that the pressure of the supply liquid to be supplied to the use point is kept at constant pressure, in which in the step of adjusting the exhaust amount of the exhaust gas, the exhaust amount of the exhaust gas to be discharged from the exhaust port is increased in a case where the pressure of the supply liquid measured by the pressure measuring unit increases with respect to the constant pressure, and the exhaust amount of the exhaust gas to be discharged from the exhaust port is decreased in a case where the pressure of the supply liquid measured by the pressure measuring unit decreases with respect to the constant pressure.

By this producing method, in a case where the pressure of the supply liquid to be supplied to the use point increases with respect to the constant pressure as the target, that is, in a case where the pressure of the supply liquid measured by the pressure measuring unit increases with respect to the constant pressure as the target, the exhaust amount of the exhaust gas to be discharged from the exhaust port is increased, and the pressure in the gas-liquid separation tank unit is lowered, so that the pressure of the supply liquid to be supplied to the use point is decreased. On the other hand, in a case where the pressure of the supply liquid to be supplied to the use point decreases with respect to the constant pressure as the target, that is, in a case where the pressure of the supply liquid measured by the pressure measuring unit decreases with respect to the constant pressure as the target, the exhaust amount of the exhaust gas to be discharged from the exhaust port is decreased, and the pressure in the gas-liquid separation tank unit is raised, so that the pressure of the supply liquid to be supplied to the use point is increased. Thus, it is possible to keep the supply liquid to be supplied to the use point constant.

A supply-liquid producing apparatus of the present invention includes: a mixing unit that mixes a first raw material and a second raw material to produce a mixed liquid; a pump unit that changes a flow rate of the first raw material to be supplied to the mixing unit; a gas-liquid separation tank unit that separates the mixed liquid produced by the mixing unit into a supply liquid to be supplied to a use point, and exhaust gas to be discharged from an exhaust port; a first flow measuring unit that measures the flow rate of the supply liquid to be supplied from the gas-liquid separation tank unit to the use point; a pressure measuring unit that measures pressure of the supply liquid to be supplied from the gas-liquid separation tank unit to the use point; an exhaust valve that adjusts the exhaust amount of the exhaust gas to be discharged from the exhaust port; a flow rate constant control unit that adjusts an exhaust amount of the exhaust gas to be discharged from the exhaust port by controlling the exhaust valve in response to the flow rate of the supply liquid measured by the first flow measuring unit such that the flow rate of the supply liquid to be supplied to the use point is kept at a constant flow rate; a pressure constant control unit that adjusts the exhaust amount of the exhaust gas to be discharged from the exhaust port by controlling the exhaust valve in response to the pressure of the supply liquid measured by the pressure measuring unit such that the pressure of the supply liquid to be supplied to the use point is kept at constant pressure; and a control selection unit that selects any one of flow rate constant control for adjusting the exhaust amount of the exhaust gas by the flow rate constant control unit, and pressure constant control for adjusting the exhaust amount of the exhaust gas by the pressure constant control unit, in which in a case where the control selection unit selects the flow rate constant control, the flow rate constant control unit increases the exhaust amount of the exhaust gas to be discharged from the exhaust port when the flow rate of the supply liquid measured by the first flow measuring unit increases with respect to the constant flow rate, and the flow rate constant control unit decreases the exhaust amount of the exhaust gas to be discharged from the exhaust port when the flow rate of the supply liquid measured by the first flow measuring unit decreases with respect to the constant flow rate, and in a case where the control selection unit selects the pressure constant control, the pressure constant control unit increases the exhaust amount of the exhaust gas to be discharged from the exhaust port when the pressure of the supply liquid measured by the pressure measuring unit increases with respect to the constant pressure, and the pressure constant control unit decreases the exhaust amount of the exhaust gas to be discharged from the exhaust port when the pressure of the supply liquid measured by the pressure measuring unit decreases with respect to the constant pressure.

According to this configuration, it is possible to select the control for keeping the flow rate of the supply liquid to be supplied to the use point constant (flow rate constant control), and the control for keeping the pressure of the supply liquid to be supplied to the use point constant (pressure constant control).

In the flow rate constant control, in a case where the flow rate of the supply liquid to be supplied to the use point increases with respect to the constant flow rate as the target, that is, in a case where the flow rate of the supply liquid measured by the flow measuring unit increases with respect to the constant flow rate as the target, the exhaust amount of the exhaust gas to be discharged from the exhaust port is increased, and the pressure in the gas-liquid separation tank unit is lowered, so that the flow rate of the supply liquid to be supplied to the use point is decreased. On the other hand, in a case where the flow rate of the supply liquid to be supplied to the use point decreases with respect to the constant flow rate as the target, that is, in a case where the flow rate of the supply liquid measured by the flow measuring unit decreases with respect to the constant flow rate as the target, the exhaust amount of the exhaust gas to be discharged from the exhaust port is decreased, and the pressure in the gas-liquid separation tank unit is raised, so that the flow rate of the supply liquid to be supplied to the use point is increased. Thus, it is possible to keep the flow rate of the supply liquid to be supplied to the use point constant.

In the pressure constant control, in a case where the pressure of the supply liquid to be supplied to the use point increases with respect to the constant pressure as the target, that is, in a case where the pressure of the supply liquid measured by the pressure measuring unit increases with respect to the constant pressure as the target, the exhaust amount of the exhaust gas to be discharged from the exhaust port is increased, and the pressure in the gas-liquid separation tank unit is lowered, so that the pressure of the supply liquid to be supplied to the use point is decreased. On the other hand, in a case where the pressure of the supply liquid to be supplied to the use point decrease with respect to the constant pressure as the target, that is, in a case where the pressure of the supply liquid measured by the pressure measuring unit decreases with respect to the constant pressure as the target, the exhaust amount of the exhaust gas to be discharged from the exhaust port unit is decreased, and the pressure in the gas-liquid separation tank unit is raised, so that the pressure of the supply liquid to be supplied to the use point is increased. Thus, it is possible to keep the pressure of the supply liquid to be supplied to the use point constant.

A supply-liquid producing method of the present invention includes the steps of: mixing a first raw material and a second raw material to produce a mixed liquid by a mixing unit; separating the mixed liquid produced by the mixing unit into a supply liquid to be supplied to a use point, and exhaust gas to be discharged from an exhaust port by a gas-liquid separation tank unit; measuring a flow rate of the supply liquid to be supplied from the gas-liquid separation tank unit to the use point by a flow measuring unit; measuring pressure of the supply liquid to be supplied from the gas-liquid separation tank unit to the use point by a pressure measuring unit; and selecting any one of flow rate constant control for adjusting an exhaust amount of the exhaust gas to be discharged from the exhaust port by controlling the exhaust valve in response to the flow rate of the supply liquid measured by the flow measuring unit such that the flow rate of the supply liquid to be supplied to the use point is kept at a constant flow rate, and pressure constant control for adjusting the exhaust amount of the exhaust gas to be discharged from the exhaust port by controlling the exhaust valve in response to the pressure of the supply liquid measured by the pressure measuring unit such that the pressure of the supply liquid to be supplied to the use point is kept at constant pressure, in which in a case where the flow rate constant control is selected, the exhaust amount of the exhaust gas to be discharged from the exhaust port is increased when the flow rate of the supply liquid measured by the flow measuring unit increases with respect to the constant flow rate, and the exhaust amount of the exhaust gas to be discharged from the exhaust port is decreased when the flow rate of the supply liquid measured by the flow measuring unit decreases with respect to the constant flow rate, and in a case where the pressure constant control is selected, the exhaust amount of the exhaust gas to be discharged from the exhaust port is increased when the pressure of the supply liquid measured by the pressure measuring unit increases with respect to the constant pressure, and the exhaust amount of the exhaust gas to be discharged from the exhaust port is decreased when the pressure of the supply liquid measured by the pressure measuring unit decreases with respect to the constant pressure.

By this producing method, it is possible to select the control for keeping the flow rate of the supply liquid to be supplied to the use point constant (flow rate constant control), and the control for keeping the pressure of the supply liquid to be supplied to the use point constant (pressure constant control).

In the flow rate constant control, in a case where the flow rate of the supply liquid to be supplied to the use point increases with respect to the constant flow rate as the target, that is, in a case where the flow rate of the supply liquid measured by the flow measuring unit increases with respect to the constant flow rate as the target, the exhaust amount of the exhaust gas to be discharged from the exhaust port is increased, and the pressure in the gas-liquid separation tank unit is lowered, so that the flow rate of the supply liquid to be supplied to the use point is decreased. On the other hand, in a case where the flow rate of the supply liquid to be supplied to the use point decreases with respect to the constant flow rate as the target, that is, in a case where the flow rate of the supply liquid measured by the flow measuring unit decreases with respect to the constant flow rate as the target, the exhaust amount of the exhaust gas to be discharged from the exhaust port is decreased, and the pressure in the gas-liquid separation tank unit is raised, so that the flow rate of the supply liquid to be supplied to the use point is increased. Thus, it is possible to keep the flow rate of the supply liquid to be supplied to the use point constant.

In the pressure constant control, in a case where the pressure of the supply liquid to be supplied to the use point increases with respect to the constant pressure as the target, that is, in a case where the pressure of the supply liquid measured by the pressure measuring unit increases with respect to the constant pressure as the target, the exhaust amount of the exhaust gas to be discharged from the exhaust port is increased, and the pressure in the gas-liquid separation tank unit is lowered, so that the pressure of the supply liquid to be supplied to the use point is decreased. On the other hand, in a case where the pressure of the supply liquid to be supplied to the use point decreases with respect to the constant pressure as the target, that is, in a case where the pressure of the supply liquid measured by the pressure measuring unit decreases with respect to the constant pressure as the target, the exhaust amount of the exhaust gas to be discharged from the exhaust port is decreased, and the pressure in the gas-liquid separation tank unit is raised, so that the pressure of the supply liquid to be supplied to the use point is increased. Thus, it is possible to keep the pressure of the supply liquid to be supplied to the use point constant.

Advantageous Effect of Invention

According to the present invention, it is possible to produce a supply liquid (such as ozone water) by an amount needed at a use point. Furthermore, according to the present invention, it is possible to supply a proper amount of ozone water (supply liquid) to the use point in a gas-liquid mixed state in which ozone water and ozone gas coexist.

DESCRIPTION OF EMBODIMENTS

Hereinafter, supply-liquid producing apparatuses of embodiments of the present invention will be described with reference to the drawings. In each of these embodiments, a case of a supply-liquid producing apparatus used for production of ozone water or the like used for cleaning of semiconductor devices, liquid crystal electronic components, and the like, is exemplified.

The "pressure constant", and the "constant pressure" in this specification each mean that an average pressure value within a predetermined or arbitrary time interval is constant, or substantially constant. Additionally, the "flow rate constant", and the "constant flow rate" in this specification each mean that an average flow rate value within a predetermined or arbitrary time interval is constant, or substantially constant. Furthermore, the "concentration constant", and the "constant concentration" in this specification each mean that an average constituent concentration value of chemical species dissolved in a certain liquid within a predetermined or arbitrary time interval is constant, or substantially constant.

First Embodiment

Figure 1:
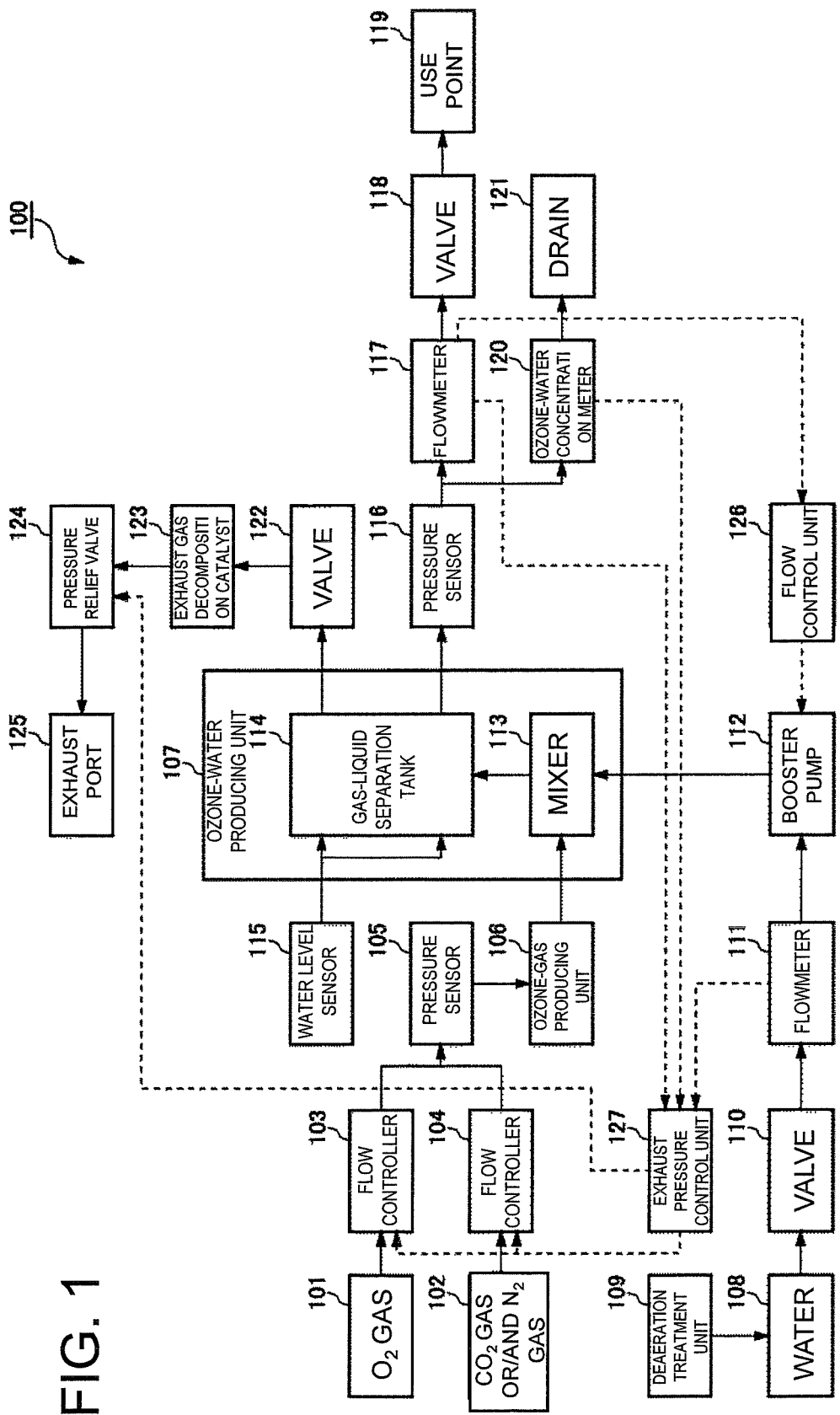
FIG. 1 is an explanatory drawing illustrating a configuration of a supply-liquid producing apparatus according to a first embodiment of the present invention.

A configuration of a supply-liquid producing apparatus of a first embodiment of the present invention will be described with reference to the drawings. FIG. 1 is an explanatory drawing illustrating the configuration of the supply-liquid producing apparatus of this embodiment. As illustrated in FIG. 1, the supply-liquid producing apparatus 100 includes supply sources 101, 102 for a first gas ($O_2$ gas) and a second gas ($CO_2$ gas, $N_2$ gas, or mixed gas of $CO_2$ gas and $N_2$ gas) as raw materials, and flow controllers 103, 104 that control the flow rates of the respective gases (the first gas and the second gas). The second gas ($CO_2$ gas, $N_2$ gas, or mixed gas of $CO_2$ gas and $N_2$ gas) is not always essential, and only the first gas ($O_2$ gas) may be used. The pressure of the first gas and the pressure of the second gas are measured by a pressure sensor 105, and thereafter sent to an ozone-gas producing unit 106. The ozone gas produced by the ozone-gas producing unit 106 is sent to an ozone-water producing unit 107.

The supply-liquid producing apparatus 100 includes a supply source 108 for water (ultrapure water) as a first raw material. This supply-liquid producing apparatus 100 includes a deaeration treatment unit 109 that performs deaeration treatment in order to remove excess gas (such as oxygen, nitrogen, and carbonic acid gas) into the water as the first raw material. The deaeration treatment can be performed by utilizing a known method such as a method for performing evacuation through a deaeration treatment film, for example. Additionally, the supply-liquid producing apparatus 100 is provided with a valve 110 for adjusting the flow rate of the water as the first raw material, and a flowmeter 111 for measuring the flow rate of the water as the first raw material. The flow rate of the water as the first raw material is measured by the flowmeter 111, and thereafter the water is sent to a booster pump (or also simply referred to as a pump. The same applies to the following.) 112, and is sent to the ozone-water producing unit 107 after the pressure of the water is adjusted (increased) by the booster pump 112. The pressure of the water sent to the ozone-water producing unit 107 is set to, for example, 0.1 to 1.0 MPa. The pressure of the pump 112 is changed, so that the flow rate of the water sent to the ozone-water producing unit 107 is adjusted.

The ozone-water producing unit 107 includes a mixer 113 that mixes the water (first raw material) and the ozone gas (second raw material) to produce ozone water (mixed liquid). The mixer 113 is preferably a unit that mixes water and gas by utilizing a venturi effect. As such a mixer 113, for example, an aspirator, an ejector or the like is used. The produced ozone water is sent to a gas-liquid separation tank 114. In the gas-liquid separation tank 114, the ozone water (mixed liquid) produce by the mixer 113 is separated into ozone water (supply liquid) and exhaust gas (exhaust gas). This gas-liquid separation tank 114 is provided with a water level sensor 115 for measuring the water level of ozone water. The pressure of the separated ozone water (supply liquid) is measured by a pressure sensor 116, and the flow rate of the separated ozone water is measured by a flowmeter 117, and thereafter the separated ozone water is sent to a use point 119 (such as a multi-chamber type sheet type cleaning apparatus) through a valve 118.

The concentration of the separated ozone water (supply liquid) is measured by an ozone-water concentration meter 120, and the separated ozone water is to be discharged from a drain 121. On the other hand, the separated exhaust gas (exhaust gas) is sent from the gas-liquid separation tank 114 to an exhaust gas decomposition catalyst 123 through a valve 122 to be subjected to decomposition treatment, and thereafter is returned to the atmospheric pressure by a pressure relief valve 124 to be discharged from an exhaust port 125. In the pressure relief valve 124, because sudden pressure change can be prevented, and the pressure can be kept constant, an air control type relief valve is preferably employed. In a case where there is no risk that no sudden pressure change occurs, a spring type relief valve can be employed. The spring type relief valve is more inexpensive than the air control type relief valve, and is advantageous in reduction in cost.

The supply-liquid producing apparatus 100 includes a flow control unit (i.e., a boosting control unit) 126, and an exhaust pressure control unit 127. The flow control unit (i.e., the boosting control unit) 126 adjusts the pressure of water to be increased in pressure and supplied to the mixer 113 by controlling the booster pump 112 in response to the water flow rate measured by the flowmeter 111 or the flow rate of the ozone water measured by the flowmeter 117. More specifically, for example, the flow control unit receives a flow rate value of the ozone water measured by the flowmeter 117, produces a control signal for controlling the booster pump 112 in response to the received flow rate value, transmits this control signal to the booster pump 112, and controls the rotation speed of the pump by controlling a drive unit (not illustrated) provided in the booster pump 112, and can adjust the pressure (or the flow rate) of water to be supplied to the mixer 113. Additionally, the exhaust pressure control unit 127 adjusts the exhaust pressure of exhaust gas so as to keep the water level in the gas-liquid separation tank 114 constant by controlling the pressure relief valve 124 in response to the flow rate of the water measured by the flowmeter 111, the flow rate of the ozone water measured by the flowmeter 117, and the concentration of the ozone water measured by the ozone-water concentration meter 120.

The supply-liquid producing apparatus 100 can adjust the water level of the gas-liquid separation tank 114 to be constant. For example, the water level in the gas-liquid separation tank 114 is measured by the water level sensor 115, so that it is possible to adjust the water level in the gas-liquid separation tank 114 to be constant. Additionally, the supply-liquid producing apparatus 100 controls such that the flow rate of the water measured by the flowmeter 111, and the flow rate of the ozone water measured by the flowmeter 117 become the same, so that it is possible to adjust the water level in the gas-liquid separation tank 114 to be constant.

The operation of the supply-liquid producing apparatus 100 thus configured of the first embodiment will be described.

In a case where ozone water is produced by using the supply-liquid producing apparatus 100 of the first embodiment, the first gas ($O_2$ gas) as a raw material and the second gas ($CO_2$ gas, $N_2$ gas, or mixed gas of $CO_2$ gas and $N_2$ gas) are supplied from the supply sources 101, 102. The respective flow rates of the first gas and the second gas are controlled by the flow controllers 103, 104. Additionally, the water (pure water) as the first raw material is supplied from the supply source 108. The flow rate of the water is measured by the flowmeter 111. The flow controllers 103, 104 control the respective flow rates of the first gas and the second gas in response to the flow rate of the water measured by the flowmeter 111. That is, relation between the flow rate of the water and the respective flow rates of the first gas and the second gas is previously obtained in order to produce ozone water having predetermined concentration, and the respective flow rates of the first gas and the second gas are controlled in response to the flow rate of the water measured by the flowmeter 111.

The pressure of the first gas and the pressure of the second gas are measured by the pressure sensor 105, and thereafter the first gas and the second gas are sent to the ozone-gas producing unit 106. In the ozone-gas producing unit 106, ozone gas is produced from the first gas ($P_2$ gas) and the second gas ($CO_2$ gas, $N_2$ gas, or mixed gas of $CO_2$ gas and $N_2$ gas) by discharge. The produced ozone gas (second raw material) is sent to the ozone-water producing unit 107. On the other hand, the flow rate of the water (first raw material) is measured by the flowmeter 111, and thereafter the water is sent to the booster pump 112. Thereafter, the pressure of the water is adjusted by the booster pump 112, and the water is sent to the ozone-water producing unit 107. The flow control unit 126 adjusts the pressure of the water to be sent to the ozone-water producing unit 107 in a pressure range of 0.1 MPa to 1 MPa by controlling the booster pump 112. As the booster pump 112, for example, a centrifugal pump or the like is used.

In the mixer 113 of the ozone-water producing unit 107, the water and the ozone gas are mixed to produce ozone water, and the produced ozone water is sent to the gas-liquid separation tank 114. In the gas-liquid separation tank 114, the ozone water (mixed liquid) produced by the mixer 113 is separated into ozone water (supply liquid) and exhaust gas (exhaust gas). The pressure of the separated ozone water (supply liquid) is measured by a pressure sensor 116, and the flow rate of the separated ozone water is measured by the flowmeter 117, and thereafter the separated ozone water is sent to the use point 119 (such as a multi-chamber type sheet type cleaning apparatus) through the valve 118. In this case, the flow control unit 126 controls the booster pump 112 in response to the flow rate measured by the flowmeter 111 or the flowmeter 117.

On the other hand, the exhaust gas (exhaust gas) is sent to the exhaust gas decomposition catalyst 123 through the valve 122 to be subjected to decomposition treatment, and thereafter is returned to the atmospheric pressure by the pressure relief valve 124 to be discharged from an exhaust port 125. In this case, the exhaust pressure control unit 127 adjusts the exhaust pressure of exhaust gas so as to keep the water level in the gas-liquid separation tank 114 constant by controlling the pressure relief valve 124 in response to the flow rate of the water measured by the flowmeter 111, the flow rate of the ozone water measured by the flowmeter 117, and the concentration of the ozone water measured by the ozone-water concentration meter 120. The exhaust pressure control unit adjusts the exhaust pressure of exhaust gas so as to keep the water level in the gas-liquid separation tank 114 constant by controlling the pressure relief valve 124 in response to the water level in the gas-liquid separation tank 114 measured by the water level sensor 115.

According to such a supply-liquid producing apparatus 100 of the first embodiment, the flow rate of the supply liquid (ozone water) to be supplied to the use point 119 is measured after the gas-liquid separation, and therefore the flow rate of the supply liquid (ozone water) can be accurately measured by any influence by air bubbles of gas (exhaust gas) generated by mixing the first raw material (water) and the second raw material (ozone gas). The pressure of the water (to be increased in pressure and supplied to the mixing unit) as the first raw material is adjusted in response to the flow rate of the supply liquid (ozone water) thus measured, and the exhaust pressure of the exhaust gas is controlled, so that the water level in the gas-liquid separation tank 114 is kept constant. Consequently, the supply liquid (ozone water) can be produced by an amount needed at the use point 119.

In this embodiment, the water level in the gas-liquid separation tank 114 can be kept constant, and therefore the supply liquid (ozone water) can be produced by an amount needed at the use point 119. For example, the water level in the gas-liquid separation tank 114 is measured by the water level sensor 115. Consequently, the water level in the gas-liquid separation tank 114 can be kept constant, and the supply liquid (ozone water) can be produced by an amount needed at the use point 119.

Alternately, the flow rate of the water to be supplied to the mixer 113 is measured by the flowmeter 111, and the flow rate of the ozone water to be discharged from the gas-liquid separation tank 114 (to be supplied to the use point 119) is measured. Then, the flow rate of the water to be supplied to the mixer 113 and the flow rate of the ozone water to be discharged from the gas-liquid separation tank 114 are made to be the same, so that the amount of the liquid in the gas-liquid separation tank 114 can be kept constant, and the supply liquid (ozone water) can be produced by an amount needed at the use point 119.

In this embodiment, the mixer 113 can mix the water and the ozone gas to produce the ozone water. In this case, the booster pump 112 is disposed at a front stage of the mixer 113 (upstream side with respect to the mixer 113), and therefore the booster pump 112 allows only the water to pass (booster pump 112 does not allow the ozone water to pass). Therefore, the life of the booster pump 112 is prolonged compared to a case where the booster pump 112 is provided at a rear stage of the mixer 113 (in a case where the booster pump 112 allows the ozone water to pass).

Second Embodiment

Now, a supply-liquid producing apparatus of a second embodiment of the present invention will be described. Herein, points of the supply-liquid producing apparatus of the second embodiment different from the points of the first embodiment will be mainly described. Unless specifically mentioned herein, a configuration and operation of this embodiment are similar to the configuration and the operation of the first embodiment.

Figure 2:
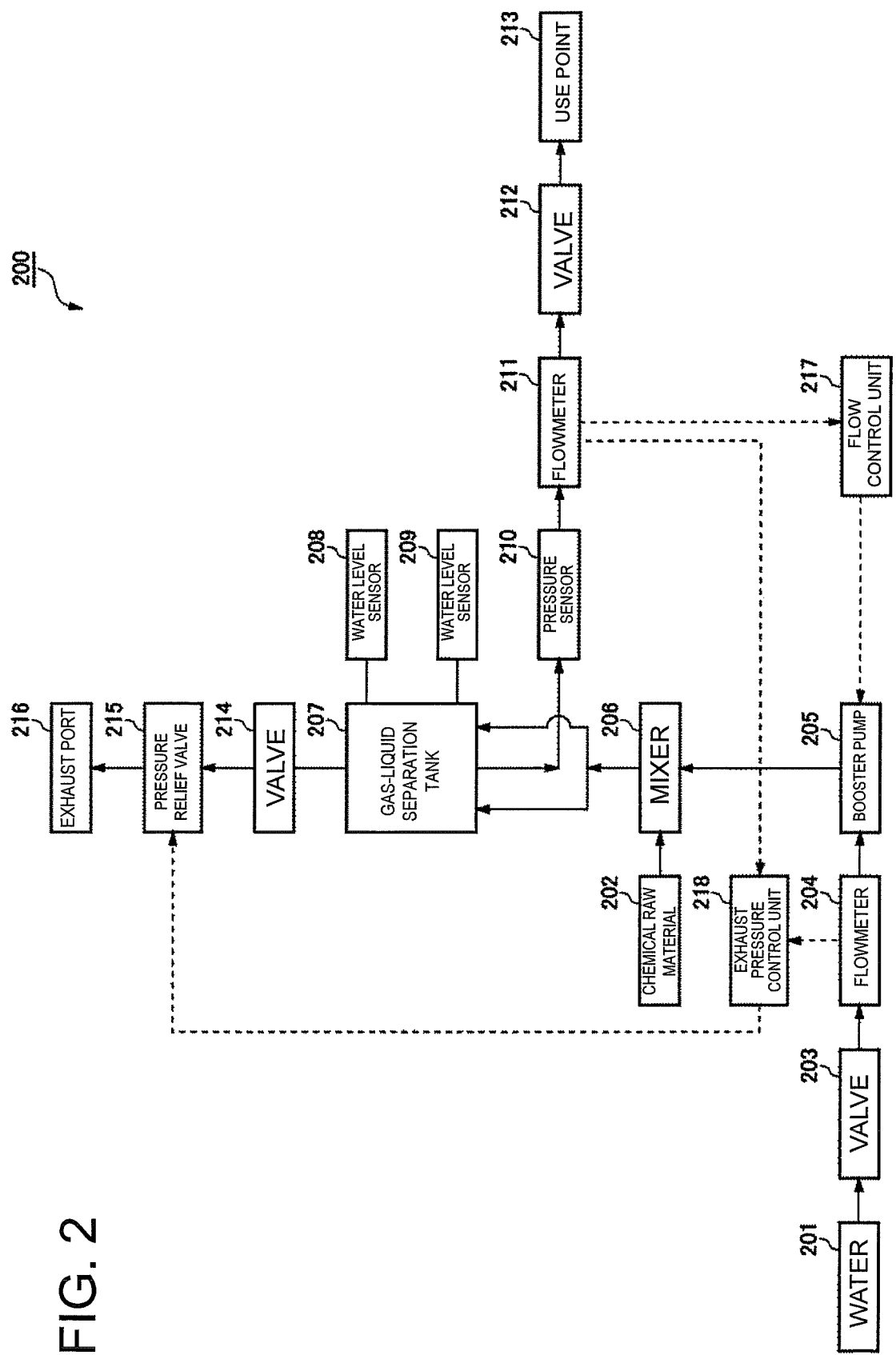
FIG. 2 is an explanatory drawing illustrating a configuration of a supply-liquid producing apparatus according to a second embodiment of the present invention.

FIG. 2 is an explanatory drawing illustrating a configuration of the supply-liquid producing apparatus of this embodiment. As illustrated in FIG. 2, the supply-liquid producing apparatus 200 includes a supply source 201 for water (ultrapure water) as a first raw material, and a supply source 202 for a chemical raw material (such as ammonia) as a second raw material. Additionally, the supply-liquid producing apparatus 200 is provided with a valve 203 for adjusting the flow rate of the water as the first raw material, and a flowmeter 204 for measuring the flow rate of the water as the first raw material. The flow rate of the water as the first raw material is measured by the flowmeter 204, and thereafter the water is sent to a booster pump 205, and is sent to a mixer 206 after the pressure of the water is adjusted (increased) by the booster pump 205. The chemical raw material as the second raw material is also sent to the mixer 206.

The mixer 206 mixes the water and the chemical raw material (ammonia) to produce chemical water (ammonia water). The produced chemical water (ammonia water) is sent to a gas-liquid separation tank 207. In the gas-liquid separation tank 207, the chemical water (mixed liquid) produced by the mixer 206 is separated into chemical water (supply liquid) and exhaust gas (exhaust gas). This gas-liquid separation tank 207 is provided with two water level sensors 208, 209 for measuring an upper limit water level and a lower limit water level of the chemical water, respectively. The pressure of the separated chemical water (supply liquid) is measured by a pressure sensor 210, and the flow rate of the separated chemical water is measured by a flowmeter 211, and thereafter the separated chemical water is sent to a use point 213 (such as a multi-chamber type sheet type cleaning apparatus) through a valve 212.

On the other hand, the separated exhaust gas (exhaust gas) is sent from the gas-liquid separation tank 207 to a pressure relief valve 215 through a valve 214 to be returned to the atmospheric pressure by the pressure relief valve 215, and thereafter is to be discharged from an exhaust port 216.

The supply-liquid producing apparatus 200 includes a flow control unit (i.e., a boosting control unit) 217, and an exhaust pressure control unit 218. The flow control unit (i.e., the boosting control unit) 217 adjusts the pressure of water to be increased in pressure and supplied to the mixer 206 by controlling the booster pump 205 in response to the flow rate of the chemical water (ammonia water) measured by the flowmeter 204 or the flowmeter 211. More specifically, the flow control unit receives a flow rate value measured by the flowmeter 204 or the flowmeter 211, produces a control signal for controlling the booster pump 205 in response to the received flow rate value, transmits this control signal to the booster pump 205, and controls the rotation speed of the pump by controlling a drive unit (not illustrated) provided in the booster pump 205, and can adjust the pressure (or the flow rate) of water to be supplied to the mixer 206. Additionally, the exhaust pressure control unit 128 adjusts the exhaust pressure of exhaust gas so as to keep the water level in the gas-liquid separation tank 207 constant by controlling the pressure relief valve 215 in response to the flow rate of the water measured by the flowmeter 204, and the flow rate of the ammonia water measured by the flowmeter 211.

This supply-liquid producing apparatus 200 can adjust the water level of the gas-liquid separation tank 207 to be constant. For example, the upper limit water level and the lower limit water level in the gas-liquid separation tank 207 is measured by the two water level sensors 208, 209 respectively, so that it is possible to adjust the water level of the gas-liquid separation tank 207 to be constant. Additionally, the supply-liquid producing apparatus 200 controls such that the flow rate of the water measured by the flowmeter 204, and the flow rate of the chemical water (ammonia water) by the flowmeter 211 become the same, so that the water level of the gas-liquid separation tank 207 can be adjusted to be constant.

Effects similar to those of the first embodiment are exhibited by such a supply-liquid producing apparatus of the second embodiment. In this embodiment, a mixing unit can mix water and a chemical raw material (such as ammonia) to produce chemical water (such as ammonia water).

Third Embodiment

Now, a supply-liquid producing apparatus of a third embodiment of the present invention will be described. Herein, points of the supply-liquid producing apparatus of the third embodiment different from the points of the first embodiment will be mainly described. Unless specifically mentioned herein, a configuration and operation of this embodiment are similar to the configuration and the operation of the first embodiment.

Figure 3:
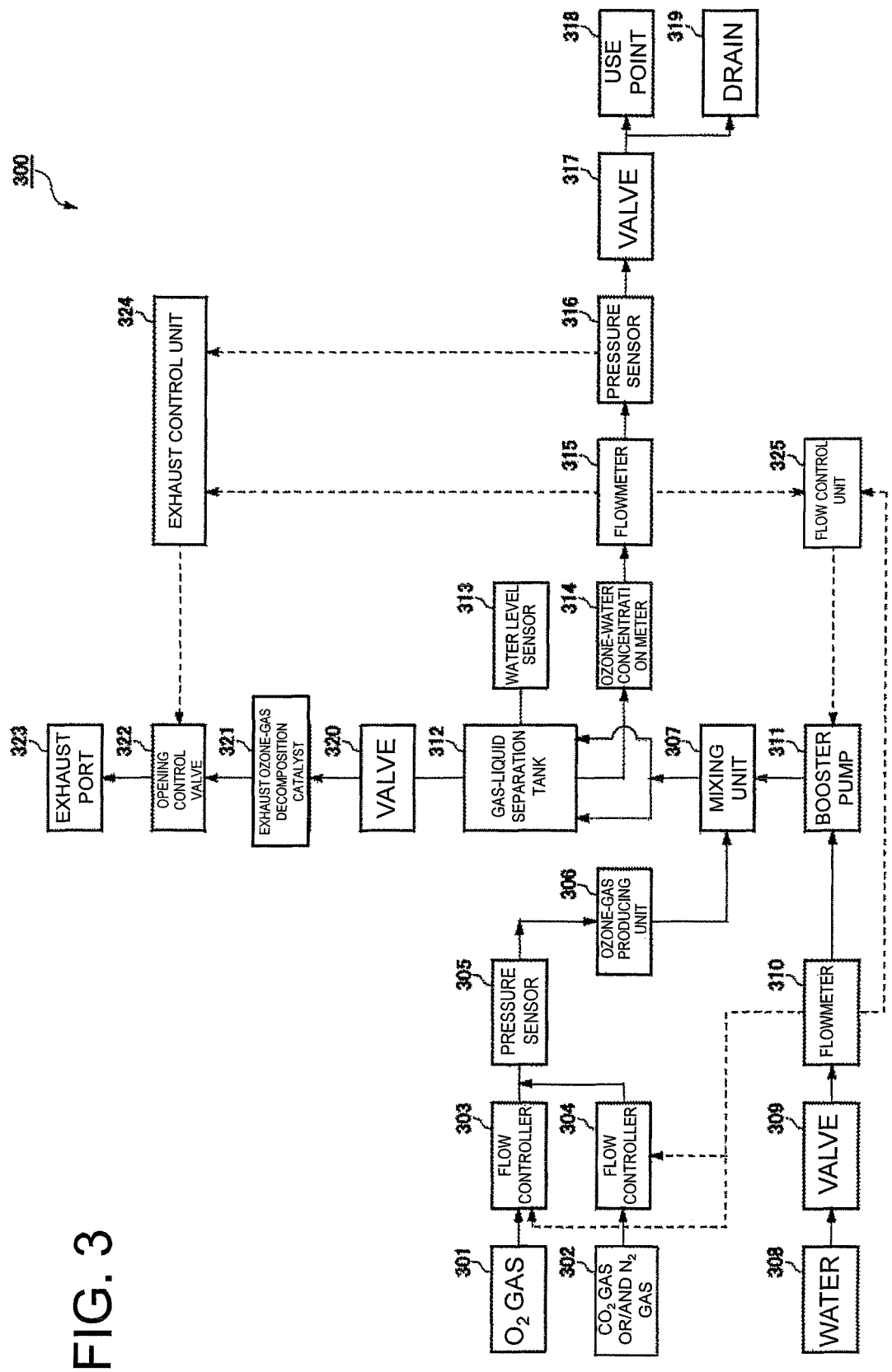
FIG. 3 is an explanatory drawing illustrating a configuration of a supply-liquid producing apparatus according to a third embodiment of the present invention.

FIG. 3 is an explanatory drawing illustrating a configuration of the supply-liquid producing apparatus of this embodiment. As illustrated in FIG. 3, the supply-liquid producing apparatus 300 includes supply sources 301, 302 for a first gas ($O_2$ gas) and a second gas ($CO_2$ gas, $N_2$ gas, or mixed gas of $CO_2$ gas and $N_2$ gas) as raw materials, and flow controllers 303, 304 that control the flow rates of the respective gases (the first gas and the second gas). The second gas ($CO_2$ gas, $N_2$ gas, or mixed gas of $CO_2$ gas and $N_2$ gas) is not always essential, and only the first gas ($O_2$ gas) may be used. The pressure of the first gas and the pressure of the second gas are measured by a pressure sensor 305, and thereafter sent to an ozone-gas producing unit 306. This ozone-gas producing unit 306 is configured to produce ozone gas by employing a silent discharge system, an electrolysis system, or an ultraviolet lamp system. The ozone gas produced by the ozone-gas producing unit 306 is sent to a mixing unit 307. The flow controllers 303, 304 can monitor whether the respective flow rates of the first gas and the second gas are each within a proper range, by using a pressure value measured by the pressure sensor 305.

The supply-liquid producing apparatus 300 includes a supply source 308 for water (ultrapure water) as a first raw material. Additionally, the supply-liquid producing apparatus 100 is provided with a valve 309 for turning on/off supply of the water as the first raw material, and a flowmeter 310 for measuring the flow rate of the water as the first raw material. The flow rate of the water as the first raw material is measured by the flowmeter 310, and thereafter the water is sent to a pump 311, and is sent to the mixing unit 307 after the flow rate of the water is adjusted by the pump 311. Herein, as the pump 311, for example, a centrifugal pump is used. Hereinafter, an example of the centrifugal pump as the pump 311 will be described. The flowmeter 310 is equivalent to a second flow measuring unit.

The mixing unit 307 mixes the water (first raw material) and the ozone gas (second raw material) to produce ozone water (mixed liquid). The mixing unit 307 is preferably a unit that mixes water and gas by utilizing a venturi effect, and, for example, an aspirator, an ejector or the like is used.

The ozone water produced by the mixing unit 307 is sent to a gas-liquid separation tank 312. In the gas-liquid separation tank 312, the ozone water (mixed liquid) produced by the mixing unit 307 is separated into ozone water (supply liquid) and exhaust gas (exhaust gas). This gas-liquid separation tank 312 is provided with a water level sensor 313 for measuring the water level of ozone water. The water level sensor 313 is, for example, a sensor that is installed at a predetermined height in the gas-liquid separation tank 312, and detects whether a liquid level of the ozone water is above or below the height of the water level sensor 313. Alternatively, the water level sensor 313 may be a unit that normally measures the water level (liquid amount) of the ozone water in the gas-liquid separation tank 312. The concentration of the separated ozone water (supply liquid) is measured by an ozone-water concentration meter 314, the flow rate of the separated ozone water is measured by a flowmeter 315, the pressure of the separated ozone water is measured by a pressure sensor 316, and thereafter the separated ozone water is sent to a use point 318 (such as a multi-chamber type sheet type cleaning apparatus) or a drain 319 through a valve 317.

During steady operation of this apparatus, the valve 317 is switched to the drain 319 side at the timing when the ozone water is not used at the use point, so that the ozone water is caused to flow in a drain 319 at a minimum flow rate. This is because the quality of the ozone water is kept constant. Additionally, at the time of start-up or maintenance of the apparatus, unnecessary ozone water is to be discharged from the drain 319.

On the other hand, the separated exhaust gas (exhaust gas) is sent from the gas-liquid separation tank 312 to an exhaust gas decomposition catalyst 321 through a valve 320 to be subjected to decomposition treatment, and thereafter is to be discharged from an exhaust port 323 through an opening control valve 322. Herein, the flowmeter 315 is equivalent to a first flow measuring unit of the present invention, and the pressure sensor 316 is equivalent to a pressure measuring unit of the present invention. Additionally, the opening control valve 322 is equivalent to an exhaust valve of the present invention.

(Flow Rate Constant Control)

The supply-liquid producing apparatus 300 includes an exhaust control unit 324, and a flow control unit 325. The exhaust control unit 324 has a function of performing flow rate constant control for keeping the flow rate of the ozone water (supply liquid) to be supplied to the use point 318 at a constant flow rate. Herein, the constant flow rate may be called a target flow rate. The constant flow rate or the target flow rate is not always a fixed value in the supply-liquid producing apparatus 300, but is arbitrarily set as a flow rate needed at the use point.

The gas-liquid separation tank 312 is connected to the opening control valve 322, and the pressure of an upper space of an ozone water liquid level in the gas-liquid separation tank 312 is adjusted by the opening control valve 322. The ozone gas is released from the ozone water, and therefore the pressure of the upper space of the ozone water liquid level in the gas-liquid separation tank 312 changes with time. The flow rate of the ozone water (supply liquid) to be supplied to the use point 318 is influenced not only by the rotation speed of the pump 311 but also the pressure of the upper space in the gas-liquid separation tank.

In a case where the flow rate constant control is performed, the exhaust control unit 324 adjusts the exhaust amount of exhaust gas (exhaust gas) to be discharged from the exhaust port 323 by controlling the opening control valve 322 in response to the flow rate of the ozone water (supply liquid) measured by the flowmeter 315. More specifically, the exhaust control unit 324 increases the exhaust amount of the exhaust gas (exhaust gas) to be discharged from the exhaust port 323 in a case where the flow rate of the ozone water (supply liquid) measured by the flowmeter 315 increases with respect to the constant flow rate as the target, and the exhaust control unit 324 decreases the exhaust amount of the exhaust gas (exhaust gas) to be discharged from the exhaust port 323 in a case where the flow rate of the ozone water (supply liquid) measured by the flowmeter 315 decreases with respect to the constant flow rate as the target.

The flow control unit 325 adjusts the flow rate of the first raw material to be supplied to the mixing unit by controlling the rotation speed of a pump 311 in response to the flow rate of the ozone water (supply liquid) measured by the flowmeter 315.

More specifically, the flow control unit 325 controls such that the flow rate of the first raw material to be measured by the flowmeter 310 and supplied to the mixing unit becomes the same as the flow rate of the ozone water (supply liquid) measured by the flowmeter 315. Therefore, in this embodiment, the flow control unit 325 adjusts the flow rate of the first raw material to be supplied to the mixing unit by receiving the flow rate value measured by the flowmeter 315, producing a control signal for controlling the rotation speed of the pump 311 in response to the received flow rate value, and transmitting this control signal to the pump 311 to control the rotation speed of the pump 311.

The flow control unit 315 may decrease the flow rate of the first raw material to be supplied to the mixing unit in a case where the amount of the liquid in the gas-liquid separation tank 312 measured by the water level sensor 313 increases with respect to a predetermined liquid amount, and the flow control unit 325 may increase the flow rate of the first raw material to be supplied to the mixing unit in a case where the amount of the liquid in the gas-liquid separation tank 312 measured by the water level sensor 313 decreases with respect to the predetermined liquid amount. More specifically, the flow control unit lowers the flow rate of the first raw material to be supplied to the mixing unit when the water level of the ozone water becomes higher than the height of the water level sensor, by using the water level sensor 313 for detecting whether or not the water level of the ozone water in the gas-liquid separation tank 312 is a certain height or more. When the water level of the ozone water becomes lower than the height of the water level sensor, the flow control unit increases the flow rate of the first raw material to be supplied to the mixing unit. Thus, the water level (liquid amount) of the ozone water in the gas-liquid separation tank 312 can be kept constant. Of course, the two water level sensors may be installed at different heights to control such that the water level of the ozone water is within a constant range. A situation where the water level of the ozone water can be kept constant means that the flow rate of the ozone water (supply liquid) to be supplied to the use point 318 is basically the same as the flow rate of the first raw material to be supplied to the mixing unit.

In a configuration in which the water level of the ozone water in the gas-liquid separation tank 312 is detected by the water level sensor 313, the flowmeter 310 is not always needed in order to keep the water level of the ozone water constant. However, the flow rate of water needs to be measured, and the flow rate of raw material gas needs to be controlled in order to keep the concentration of the ozone gas constant, and therefore the flowmeter 310 is preferably provided. In a configuration in which the flow rate of the first raw material to be supplied to the mixing unit is controlled such that the water level of the ozone water is made constant by use of the water level sensor 313 for detecting the water level of the ozone water, only the flowmeter 310 may be provided without providing the flowmeter 315.

In a case where the amount of the liquid in the gas-liquid separation tank 312 measured by the water level sensor 313 increases with respect to the predetermined liquid amount, the exhaust control unit 324 may decrease the exhaust amount of the exhaust gas (exhaust gas) to be discharged from the exhaust port 323, and raise the pressure in the gas-liquid separation tank 312 to decrease the liquid amount in the gas-liquid separation tank 312. On the other hand, in case where the amount of the liquid in the gas-liquid separation tank 312 measured by the water level sensor 313 decreases with respect to the predetermined liquid amount, the exhaust control unit 324 may increase the exhaust amount of the exhaust gas (exhaust gas) to be discharged from the exhaust port 323, and lower the pressure in the gas-liquid separation tank 312 to increase the liquid amount in the gas-liquid separation tank 312. Thus, it is possible to keep the liquid amount in the gas-liquid separation tank 312 constant.

According to such a supply-liquid producing apparatus 300 of the third embodiment, it is possible to perform the flow rate constant control. Therefore, in a case where the flow rate of the ozone water (supply liquid) to be supplied to the use point 318 increases with respect to the constant flow rate as the target, that is, in a case where the flow rate of the ozone water (supply liquid) measured by the flowmeter 315 increases with respect to the constant flow rate as the target, the exhaust amount of the exhaust gas (exhaust gas) to be discharged from the exhaust port 323 is increased, and the pressure in the gas-liquid separation tank 312 is lowered, so that the flow rate of the ozone water (supply liquid) to be supplied to the use point 318 is decreased. On the other hand, in a case where the flow rate of the ozone water (supply liquid) to be supplied to the use point 318 decreases with respect to the constant flow rate as the target, that is, in a case where the flow rate of the ozone water (supply liquid) measured by the flowmeter 315 decreases with respect to the constant flow rate as the target, the exhaust amount of the exhaust gas (exhaust gas) to be discharged from the exhaust port 323 is decreased, and the pressure in the gas-liquid separation tank 312 is raised, so that the flow rate of the ozone water (supply liquid) to be supplied to the use point 318 is increased. Thus, it is also possible to keep the ozone water (supply liquid) to be supplied to the use point 318 constant. The pressure in the gas-liquid separation tank unit is adjusted, so that it is possible to control the flow rate of the ozone water to be supplied to the use point with good responsiveness.

(Pressure Constant Control)

As another embodiment, pressure constant control for keeping the pressure of the ozone water (supply liquid) to be supplied to the use point 318 at constant pressure can be performed by use of the configuration of the supply-liquid producing apparatus illustrated in FIG. 3. Herein, the constant pressure may be called target pressure. The constant pressure or the target pressure is not always a fixed value in the supply-liquid producing apparatus 300, but is arbitrarily set as the pressure of a supply liquid to be supplied by the supply-liquid producing apparatus 300.

In a case where the pressure constant control is performed, the exhaust control unit 324 adjusts the exhaust amount of exhaust gas (exhaust gas) to be discharged from the exhaust port 323 by controlling the opening control valve 322 in response to the pressure of the ozone water (supply liquid) measured by the pressure sensor 316.

More specifically, in a case where the pressure of the ozone water (supply liquid) to be supplied to the use point 318 increases with respect to the constant pressure as the target, that is, in a case where the pressure of the ozone water (supply liquid) measured by the pressure sensor 316 increases with respect to the constant pressure as the target, the exhaust control unit 324 increases the exhaust amount of the exhaust gas (exhaust gas) to be discharged from the exhaust port 323, and lowers the pressure in the gas-liquid separation tank 312 to decrease the pressure of the ozone water (supply liquid) to be supplied to the use point 318. On the other hand, in a case where the pressure of the ozone water (supply liquid) to be supplied to the use point 318 decreases with respect to the constant pressure as the target, that is, in a case where the pressure of the ozone water (supply liquid) measured by the pressure sensor 316 decreases with respect to the constant pressure as the target, the exhaust control unit 324 decreases the exhaust amount of the exhaust gas (exhaust gas) to be discharged from the exhaust port 323, raises the pressure in the gas-liquid separation tank 312 to increase the pressure of the ozone water (supply liquid) to be supplied to the use point 318. Thus, it is possible to keep the pressure of the ozone water (supply liquid) to be supplied to the use point 318 constant. The pressure measured by the pressure sensor 316 to be kept constant is set to, for example, 0.1 to 1.0 MPa.

In a case where the pressure constant control is performed, the flow control unit 325 controls such that the flow rate of the first raw material to be supplied to the mixing unit becomes the same as the flow rate of the ozone water to be supplied to the use point. The specific means is the same as the means mentioned in the flow rate constant control.

Similarly, in this embodiment, the flow control unit 325 may adjust the exhaust amount of the exhaust gas (exhaust gas) to be discharged from the exhaust port 323 to keep the amount of the liquid in the gas-liquid separation tank 312 constant in a case where the amount of the liquid in the gas-liquid separation tank 312 measured by the water level sensor 313 increases or decreases with respect to the predetermined liquid amount.

Figure 4:
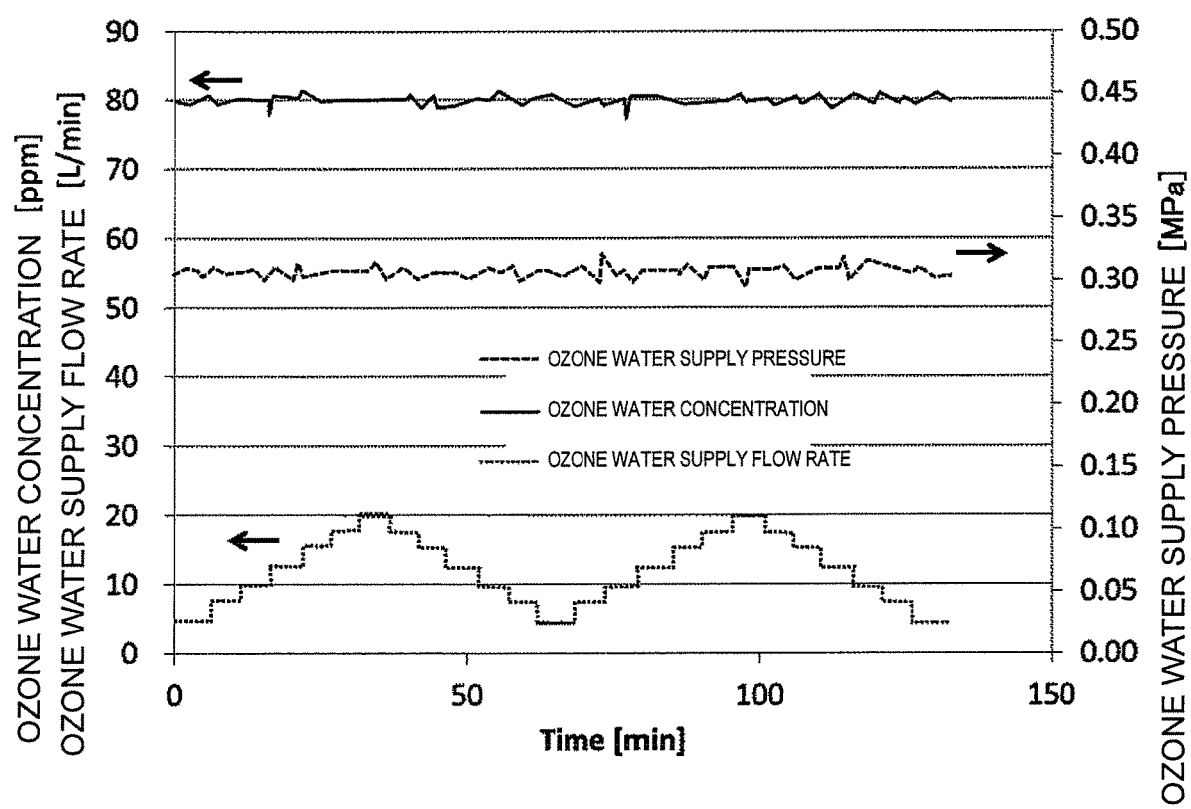
FIG. 4 is an explanatory drawing of flow rate constant control according to the third embodiment of the present invention.

FIG. 4 is a graph in which the ozone water concentration and the ozone water supply pressure are measured in a case where the pressure constant control is performed while the supply flow rate of the ozone water to be supplied to the use point changes. Thus, according to this embodiment, it is possible to supply the ozone water while keeping the pressure of the ozone water constant, and keeping the concentration of the ozone water constant, even when the flow rate needed at the use point changes.

(Modification of Third Embodiment)

Figure 5:
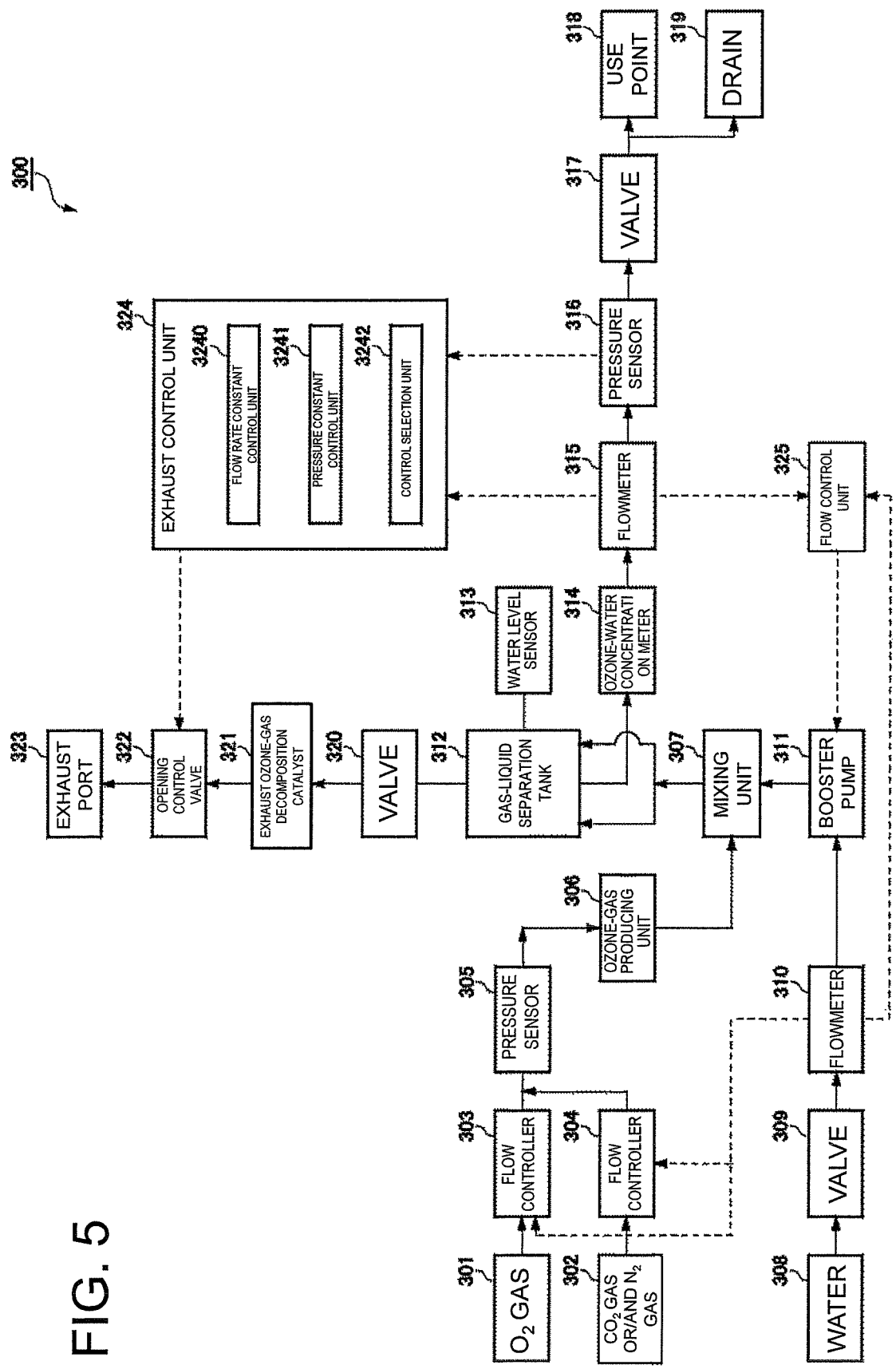
FIG. 5 is an explanatory drawing illustrating a configuration of a supply-liquid producing apparatus according to a fourth embodiment of the present invention.
Figure 6:
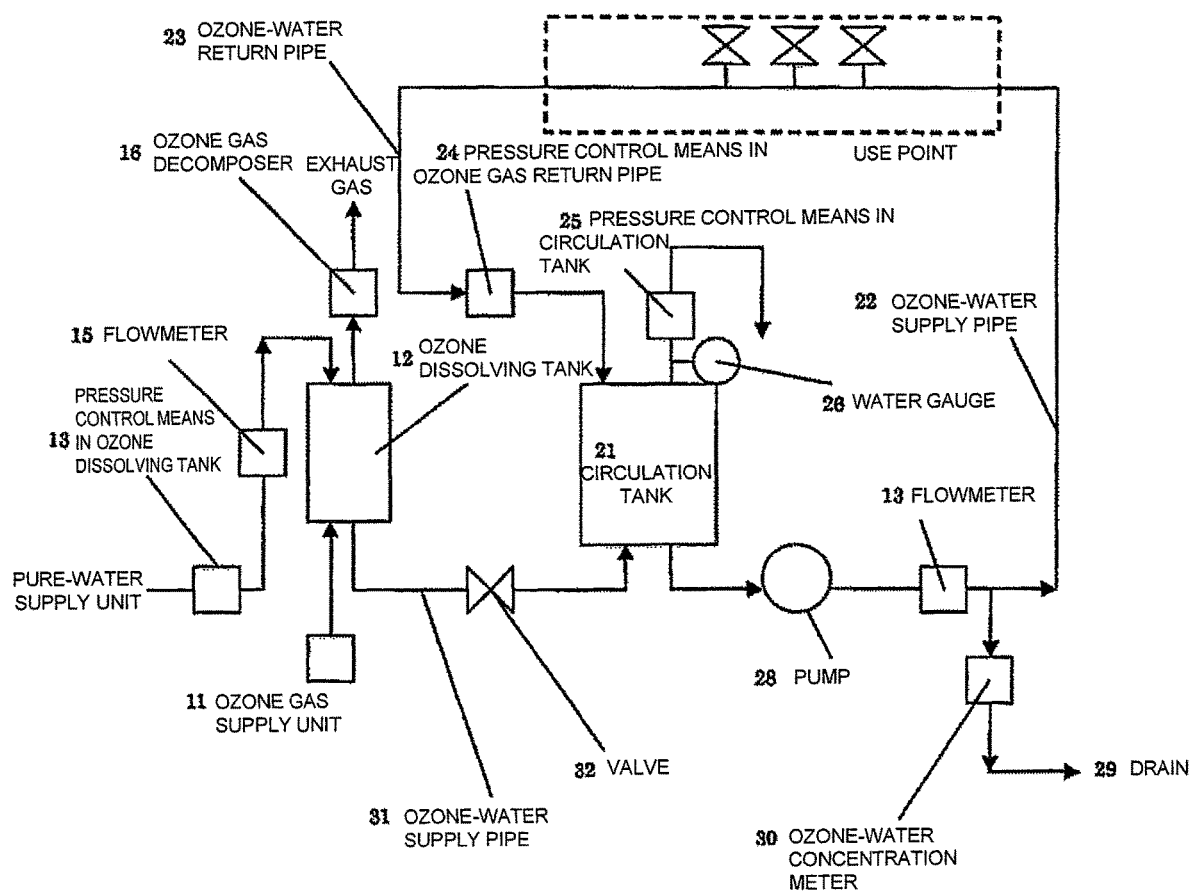
FIG. 6 is an explanatory drawing illustrating a configuration of a conventional ozone-water supplying apparatus.

FIG. 5 illustrates a modification of the supply-liquid producing apparatus 300 of the third embodiment. A supply-liquid producing apparatus 300 of this embodiment can switch flow rate constant control and pressure constant control. Therefore, an exhaust control unit 324 of this embodiment includes a flow rate constant control unit 3240 that performs flow rate constant control, a pressure constant control unit 3241 that performs pressure constant control, and a control selection unit 3242 that switches the flow rate constant control and the pressure constant control.

The flow rate constant control unit 3240 adjusts the exhaust amount of exhaust gas (exhaust gas) to be discharged from an exhaust port 323 by controlling an opening control valve 322 in response to the flow rate of ozone water (supply liquid) measured by a flowmeter 315 such that the flow rate of ozone water (supply liquid) to be supplied to a use point 318 is kept constant.

The pressure constant control unit 3241 adjusts the exhaust amount of the exhaust gas (exhaust gas) to be discharged from an exhaust port 323 by controlling the opening control valve 322 in response to the pressure of the ozone water (supply liquid) measured by a pressure sensor 316 such that the pressure of the ozone water (supply liquid) to be supplied to the use point 318 is kept constant.

The control selection unit 3242 selects any one of the flow rate constant control for adjusting the exhaust amount of the exhaust gas (exhaust gas) by the flow rate constant control unit 3240, and the pressure constant control for adjusting the exhaust amount of the exhaust gas (exhaust gas) by the pressure constant control unit 3241. For example, the flow rate constant control and the pressure constant control can be switched by operation of a touch panel (not illustrated) or the like provided in the supply-liquid producing apparatus 300. Additionally, the flow rate constant control and the pressure constant control may be switched on the basis of a require signal from the use point 318.

In a case where the control selection unit 3242 selects the flow rate constant control, the flow rate constant control unit 3240 performs the flow rate constant control. More specifically, the flow rate constant control unit 3240 increases the exhaust amount of the exhaust gas (exhaust gas) to be discharged from the exhaust port 323 when the flow rate of the ozone water (supply liquid) measured by the flowmeter 315 increases with respect to a constant flow rate as the target, and the flow rate constant control unit 3240 decreases the exhaust amount of the exhaust gas (exhaust gas) to be discharged from the exhaust port 323 when the flow rate of the ozone water (supply liquid) measured by the flowmeter 315 decreases with respect to the constant flow rate as the target.

In a case where the control selection unit 3242 selects the pressure constant control, the pressure constant control unit 3241 performs the pressure constant control. More specifically, the pressure constant control unit 3241 increases the exhaust amount of the exhaust gas (exhaust gas) to be discharged from the exhaust port 323 when the pressure of the ozone water (supply liquid) measured by the pressure sensor 316 increases with respect to constant pressure as the target, and the pressure constant control unit 3241 decreases the exhaust amount of the exhaust gas (exhaust gas) to be discharged from the exhaust port 323 when the pressure of the ozone water (supply liquid) measured by the pressure sensor 316 decreases with respect to the constant pressure rate as the target.

According to such a supply-liquid producing apparatus 300 of the modification, it is possible to select control for keeping the flow rate of the ozone water (supply liquid) to be supplied to the use point 318 constant (flow rate constant control), and control for keeping the pressure of the ozone water (supply liquid) to be supplied to the use point 318 constant (pressure constant control).

In the flow rate constant control, in a case where the flow rate of the ozone water (supply liquid) to be supplied to the use point 318 increases with respect to the constant flow rate as the target, that is, in a case where the flow rate of the ozone water (supply liquid) measured by the flowmeter 315 increases with respect to the constant flow rate as the target, the exhaust amount of the exhaust gas (exhaust gas) to be discharged from the exhaust port 323 is increased, and the pressure in a gas-liquid separation tank 312 is lowered, so that the flow rate of the ozone water (supply liquid) to be supplied to the use point 318 is decreased. On the other hand, in a case where the flow rate of the ozone water (supply liquid) to be supplied to the use point 318 decreases with respect to the constant flow rate as the target, that is, in a case where the flow rate of the ozone water (supply liquid) measured by the flowmeter 315 decreases with respect to the constant flow rate as the target, the exhaust amount of the exhaust gas (exhaust gas) to be discharged from the exhaust port 323 is decreased, and the pressure in the gas-liquid separation tank 312 is raised, so that the flow rate of the ozone water (supply liquid) to be supplied to the use point 318 is increased. Thus, it is possible to keep the flow rate of the ozone water (supply liquid) to be supplied to the use point 318 constant.

In the pressure constant control, in a case where the pressure of the ozone water (supply liquid) to be supplied to the use point 318 increases with respect to the constant pressure as the target, that is, in a case where the pressure of the ozone water (supply liquid) measured by the pressure sensor 316 increases with respect to the constant pressure as the target, the exhaust amount of the exhaust gas (exhaust gas) to be discharged from the exhaust port 323 is increased, and the pressure in the gas-liquid separation tank 312 is lowered, so that the pressure of the ozone water (supply liquid) to be supplied to the use point 318 is decreased. On the other hand, in a case where the pressure of the ozone water (supply liquid) to be supplied to the use point 318 decreases with respect to the constant pressure as the target, that is, in a case where the pressure of the ozone water (supply liquid) measured by the pressure sensor 316 decreases with respect to the constant pressure as the target, the exhaust amount of the exhaust gas (exhaust gas) to be discharged from the exhaust port 323 is decreased, and the pressure in the gas-liquid separation tank 312 is raised, so that the pressure of the ozone water (supply liquid) to be supplied to the use point 318 is increased. Thus, it is possible to keep the pressure of the ozone water (supply liquid) to be supplied to the use point 318 constant.

As described above, the embodiments of the present invention are described by exemplification. However, the scope of the present invention is not limited to theses, and changes and/or modifications can be performed in accordance with an object within the scope recited in the claims.

For example, in the above embodiments, the case where the ozone gas or the chemical raw material (such as ammonia) and water are mixed is exemplified. However, other chemical agent (such as $H_2CO_3$ (carbonic acid), HF (hydrofluoric acid), DHF (dilute hydrofluoric acid), BHF (buffered hydrofluoric acid, namely, mixture of $NH_4F$ and HF), HCl (hydrochloric acid, dilute hydrochloric acid), $H_2SO_4$ (sulfuric acid, dilute sulfuric acid), $HNO_3$ (sulfuric acid, dilute sulfuric acid), aqua regia, or mixed acid of these), and water can be mixed.

INDUSTRIAL APPLICABILITY

As described above, the supply-liquid producing apparatus according to the present invention has an effect capable of producing supply liquid by an amount needed at a use point, is used for cleaning of semiconductor devices, liquid crystal electronic components, and the like, and is useful.

REFERENCE SIGNS LIST 100 supply-liquid producing apparatus
106 ozone-gas producing unit
111 flowmeter (second flow measuring unit)
112 booster pump (booster pump unit, or pump)
113 mixer (mixing unit)
114 gas-liquid separation tank (gas-liquid separation tank unit)
115 water level sensor (liquid amount measuring unit)
117 flowmeter (flow measuring unit)
119 use point
124 pressure relief valve 125 exhaust port
126 flow control unit (boosting control unit)
127 exhaust pressure control unit
200 supply-liquid producing apparatus
211 flowmeter (second flow measuring unit)
205 booster pump (booster pump unit or pump)
206 mixer (mixing unit)
207 gas-liquid separation tank (gas-liquid separation tank unit)
208 water level sensor (liquid amount measuring unit)
209 water level sensor (liquid amount measuring unit)
211 flowmeter (flow measuring unit)
213 use point
215 pressure relief valve
216 exhaust port
217 flow control unit (boosting control unit)
218 exhaust pressure control unit
300 supply-liquid producing apparatus
307 mixing unit
311 pump
312 gas-liquid separation tank (gas-liquid separation tank unit)
313 water level sensor (liquid amount measuring unit)
315 flowmeter (flow measuring unit)
316 pressure sensor (pressure measuring unit)
318 use point
322 opening control valve (exhaust valve)
324 exhaust control unit
325 flow control unit
3240 flow rate constant control unit
3241 pressure constant control unit
3242 control selection unit

The invention claimed is:

1. A supply-liquid producing apparatus comprising:
a mixing unit that mixes a first raw material and a second raw material to produce a mixed liquid;
a pump unit that changes a flow rate of the first raw material to be supplied to the mixing unit;
a gas-liquid separation tank unit that separates the mixed liquid produced by the mixing unit into a supply liquid to be supplied to a use point, and exhaust gas to be discharged from an exhaust port;
a first flow measuring unit that measures the flow rate of the supply liquid to be supplied from the gas-liquid separation tank unit to the use point;
an exhaust valve that adjusts an exhaust amount of the exhaust gas to be discharged from the exhaust port; and
an exhaust control unit that adjusts the exhaust amount of the exhaust gas to be discharged from the exhaust port by controlling the exhaust valve in response to the flow rate of the supply liquid measured by the first flow measuring unit such that the flow rate of the supply liquid to be supplied to the use point is kept at a constant flow rate, wherein
the exhaust control unit increases the exhaust amount of the exhaust gas to be discharged from the exhaust port in a case where the flow rate of the supply liquid measured by the first flow measuring unit increases with respect to the constant flow rate, and the exhaust control unit decreases the exhaust amount of the exhaust gas to be discharged from the exhaust port in a case where the flow rate of the supply liquid measured by the first flow measuring unit decreases with respect to the constant flow rate.

2. The supply-liquid producing apparatus according to claim 1, further comprising a flow control unit that adjusts the flow rate of the first raw material to be supplied to the mixing unit by controlling the pump unit in response to the flow rate of the supply liquid measured by the first flow measuring unit, wherein
the flow control unit controls such that flow rate of the supply liquid measured by the first flow measuring unit becomes the same as the flow rate of the first raw material to be supplied to the mixing unit.

3. The supply-liquid producing apparatus according to claim 2, further comprising
a second flow measuring unit that measures the flow rate of the first raw material to be supplied to the mixing unit.

4. The supply-liquid producing apparatus according to claim 2, further comprising
a liquid amount measuring unit that detects a liquid amount in the gas-liquid separation tank unit, wherein
the boosting control unit decreases the flow rate of the first raw material to be supplied to the mixing unit in a case where the liquid amount in the gas-liquid separation tank unit measured by the liquid amount measuring unit increases with respect to a predetermined liquid amount, and the boosting control unit increases the flow rate of the first raw material to be supplied to the mixing unit in a case where the liquid amount in the gas-liquid separation tank unit measured by the liquid amount measuring unit decreases with respect to the predetermined liquid amount.

5. A supply-liquid producing method comprising the steps of:
mixing a first raw material and a second raw material to produce a mixed liquid by a mixing unit;
separating the mixed liquid produced by the mixing unit into a supply liquid to be supplied to a use point, and exhaust gas to be discharged from an exhaust port by a gas-liquid separation tank unit;
measuring a flow rate of the supply liquid to be supplied from the gas-liquid separation tank unit to the use point by a first flow measuring unit; and
adjusting an exhaust amount of the exhaust gas to be discharged from the exhaust port by an exhaust valve in response to the flow rate of the supply liquid measured by the first flow measuring unit such that the flow rate of the supply liquid to be supplied to the use point is kept at a constant flow rate, wherein
in the step of adjusting the exhaust amount of the exhaust gas, the exhaust amount of the exhaust gas to be discharged from the exhaust port is increased in a case where the flow rate of the supply liquid measured by the first flow measuring unit increases with respect to the constant flow rate, and the exhaust amount of the exhaust gas to be discharged from the exhaust port is decreased in a case where the flow rate of the supply liquid measured by the flow measuring unit decreases with respect to the constant flow rate.

6. A supply-liquid producing apparatus comprising:
a mixing unit that mixes a first raw material and a second raw material to produce a mixed liquid;
a pump unit that changes a flow rate of the first raw material to be supplied to the mixing unit;
a gas-liquid separation tank unit that separates the mixed liquid produced by the mixing unit into a supply liquid to be supplied to a use point, and exhaust gas to be discharged from an exhaust port;

a pressure measuring unit that measures pressure of the supply liquid to be supplied from the gas-liquid separation tank unit to the use point;

an exhaust valve that adjusts an exhaust amount of the exhaust gas to be discharged from the exhaust port; and an exhaust control unit that adjusts the exhaust amount of the exhaust gas to be discharged from the exhaust port by controlling the exhaust valve in response to the pressure of the supply liquid measured by the pressure measuring unit such that the pressure of the supply liquid to be supplied to the use point is kept at constant pressure, wherein the exhaust control unit increases the exhaust amount of the exhaust gas to be discharged from the exhaust port in a case where the pressure of the supply liquid measured by the pressure measuring unit increases with respect to the constant pressure, and the exhaust control unit decreases the exhaust amount of the exhaust gas to be discharged from the exhaust port in a case where the pressure of the supply liquid measured by the pressure measuring unit decreases with respect to the constant pressure.

7. The supply-liquid producing apparatus according to claim 6, further comprising a first flow measuring unit that measures the flow rate of the supply liquid to be supplied from the gas-liquid separation tank unit to the use point; and a flow control unit that adjusts the flow rate of the first raw material to be supplied to the mixing unit by controlling the pump unit in response to the flow rate of the supply liquid measured by the first flow measuring unit, wherein the flow control unit controls such that the flow rate of the supply liquid measured by the first flow measuring unit becomes the same as the flow rate of the first raw material to be supplied to the mixing unit.

8. The supply-liquid producing apparatus according to claim 7, further comprising a second flow measuring unit that measures the flow rate of the first raw material to be supplied to the mixing unit.

9. The supply-liquid producing apparatus according to claim 7, further comprising a liquid amount measuring unit that detects a liquid amount in the gas-liquid separation tank unit, wherein the flow control unit decreases the flow rate of the first raw material to be supplied to the mixing unit in a case where the liquid amount in the gas-liquid separation tank unit measured by the liquid amount measuring unit increases with respect to a predetermined liquid amount, and the flow control unit increases the flow rate of the first raw material to be supplied to the mixing unit in a case where the liquid amount in the gas-liquid separation tank unit measured by the liquid amount measuring unit decreases with respect to the predetermined liquid amount.

10. A supply-liquid producing method comprising the steps of:

mixing a first raw material and a second raw material to produce a mixed liquid by a mixing unit;

separating the mixed liquid produced by the mixing unit into a supply liquid to be supplied to a use point, and exhaust gas to be discharged from an exhaust port by a gas-liquid separation tank unit;

measuring pressure of the supply liquid to be supplied from the gas-liquid separation tank unit to the use point by a pressure measuring unit; and adjusting an exhaust amount of the exhaust gas to be discharged from the exhaust port by an exhaust valve in response to the pressure of the supply liquid measured by the pressure measuring unit such that the pressure of the supply liquid to be supplied to the use point is kept at constant pressure, wherein in the step of adjusting the exhaust amount of the exhaust gas, the exhaust amount of the exhaust gas to be discharged from the exhaust port is increased in a case where the pressure of the supply liquid measured by the pressure measuring unit increases with respect to the constant pressure, and the exhaust amount of the exhaust gas to be discharged from the exhaust port is decreased in a case where the pressure of the supply liquid measured by the pressure measuring unit decreases with respect to the constant pressure.

11. A supply-liquid producing apparatus comprising:

a mixing unit that mixes a first raw material and a second raw material to produce a mixed liquid;

a pump unit that changes a flow rate of the first raw material to be supplied to the mixing unit;

a gas-liquid separation tank unit that separates the mixed liquid produced by the mixing unit into a supply liquid to be supplied to a use point, and exhaust gas to be discharged from an exhaust port;

a first flow measuring unit that measures the flow rate of the supply liquid to be supplied from the gas-liquid separation tank unit to the use point;

a pressure measuring unit that measures pressure of the supply liquid to be supplied from the gas-liquid separation tank unit to the use point;

an exhaust valve that adjusts the exhaust amount of the exhaust gas to be discharged from the exhaust port;

a flow rate constant control unit that adjusts an exhaust amount of the exhaust gas to be discharged from the exhaust port by controlling the exhaust valve in response to the flow rate of the supply liquid measured by the first flow measuring unit such that the flow rate of the supply liquid to be supplied to the use point is kept at a constant flow rate;

a pressure constant control unit that adjusts the exhaust amount of the exhaust gas to be discharged from the exhaust port by controlling the exhaust valve in response to the pressure of the supply liquid measured by the pressure measuring unit such that the pressure of the supply liquid to be supplied to the use point is kept at constant pressure; and a control selection unit that selects any one of flow rate constant control for adjusting the exhaust amount of the exhaust gas by the flow rate constant control unit, and pressure constant control for adjusting the exhaust amount of the exhaust gas by the pressure constant control unit, wherein in a case where the control selection unit selects the flow rate constant control, the flow rate constant control unit increases the exhaust amount of the exhaust gas to be discharged from the exhaust port when the flow rate of the supply liquid measured by the first flow measuring unit increases with respect to the constant flow rate, and the flow rate constant control unit decreases the exhaust amount of the exhaust gas to be discharged from the exhaust port when the flow rate of the supply liquid measured by the flow measuring unit decreases with respect to the constant flow rate, and in a case where the control selection unit selects the pressure constant control, the pressure constant control unit increases the exhaust amount of the exhaust gas to be discharged from the exhaust port when the pressure of the supply liquid measured by the pressure measuring unit increases with respect to the constant pressure, and the pressure constant control unit decreases the exhaust amount of the exhaust gas to be discharged from the exhaust port when the pressure of the supply liquid measured by the pressure measuring unit decreases with respect to the constant pressure.

12. A supply-liquid producing method comprising the steps of:
   mixing a first raw material and a second raw material to produce a mixed liquid by a mixing unit;
   separating the mixed liquid produced by the mixing unit into a supply liquid to be supplied to a use point, and exhaust gas to be discharged from an exhaust port by a gas-liquid separation tank unit;
   measuring a flow rate of the supply liquid to be supplied from the gas-liquid separation tank unit to the use point by a flow measuring unit;
   measuring pressure of the supply liquid to be supplied from the gas-liquid separation tank unit to the use point by a pressure measuring unit; and
   selecting any one of flow rate constant control for adjusting an exhaust amount of the exhaust gas to be discharged from the exhaust port by controlling the exhaust valve in response to the flow rate of the supply liquid measured by the flow measuring unit such that the flow rate of the supply liquid to be supplied to the use point is kept at a constant flow rate, and pressure constant control for adjusting the exhaust amount of the exhaust gas to be discharged from the exhaust port by controlling the exhaust valve in response to the pressure of the supply liquid measured by the pressure measuring unit such that the pressure of the supply liquid to be supplied to the use point is kept at constant pressure, wherein in a case where the flow rate constant control is selected, the exhaust amount of the exhaust gas to be discharged from the exhaust port is increased when the flow rate of the supply liquid measured by the flow measuring unit increases with respect to the constant flow rate, and the exhaust amount of the exhaust gas to be discharged from the exhaust port is decreased when the flow rate of the supply liquid measured by the flow measuring unit decreases with respect to the constant flow rate, and in a case where the pressure constant control is selected, the exhaust amount of the exhaust gas to be discharged from the exhaust port is increased when the pressure of the supply liquid measured by the pressure measuring unit increases with respect to the constant pressure, and the exhaust amount of the exhaust gas to be discharged from the exhaust port is decreased when the pressure of the supply liquid measured by the pressure measuring unit decreases with respect to the constant pressure.

* * * * *